United States Patent
Bittner

(10) Patent No.: US 12,201,047 B2
(45) Date of Patent: Jan. 21, 2025

(54) SYSTEM AND METHOD FOR PERFORMING SPRAYING OPERATIONS WITH AN AGRICULTURAL APPLICATOR

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 554 days.

(21) Appl. No.: 17/407,244

(22) Filed: Aug. 20, 2021

(65) Prior Publication Data

US 2023/0055424 A1    Feb. 23, 2023

(51) Int. Cl.
| | |
|---|---|
| A01B 69/00 | (2006.01) |
| A01B 69/04 | (2006.01) |
| A01C 23/00 | (2006.01) |
| A01C 23/04 | (2006.01) |
| A01M 7/00 | (2006.01) |

(52) U.S. Cl.
CPC .......... *A01B 69/001* (2013.01); *A01B 69/008* (2013.01); *A01C 23/007* (2013.01); *A01C 23/047* (2013.01); *A01M 7/0042* (2013.01); *A01M 7/0089* (2013.01)

(58) Field of Classification Search
CPC .. A01M 7/0089; A01M 7/0053; A01M 7/006; A01M 7/0042; A01B 69/001; A01B 69/008; A01C 23/007; A01C 23/047
See application file for complete search history.

(56) References Cited

U.S. PATENT DOCUMENTS 5,704,546 A * 1/1998 Henderson .......... A01M 7/0089
239/69
5,768,823 A    6/1998 Nelson
(Continued)

FOREIGN PATENT DOCUMENTS

WO    WO 2019/197174    10/2019

OTHER PUBLICATIONS

"John Deere Launches See & Spray Select for 400 and 600 Series Sprayers", John Deere press release, dated Mar. 2, 2021. (4 pages) https://www.deere.com/en/our-company/news-and-announcements/news-releases/2021/agriculture/2021mar02-john-deere-launches-see-and-spray-select/.

(Continued)

*Primary Examiner* — Ebony E Evans
*Assistant Examiner* — Katelyn T Truong
(74) *Attorney, Agent, or Firm* — Rebecca Henkel; Peter K. Zacharias; Rickard K. DeMille

(57) ABSTRACT

A system for an agricultural sprayer includes a boom assembly operably coupled with a chassis. A steering system is operably coupled with the chassis and includes a steering sensor. The system also includes one or more imaging devices and one or more nozzle assemblies. A computing system is operably coupled with the one or more imaging devices and the one or more nozzle assemblies. The computing system is configured to receive data related to a first imaged portion of an agricultural field from the one or more imaging devices; identify a target within the first imaged portion of the agricultural field; receive data related to an inputted steering command from the steering system; and determine a target offset of the target relative to the sprayer path and a boom offset of the assembly relative to the sprayer path.

17 Claims, 12 Drawing Sheets

(56) References Cited

U.S. PATENT DOCUMENTS

| | | | | |
|---|---|---|---|---|
| 6,353,409 | B1* | 3/2002 | Keller | B64D 1/18 342/357.31 |
| 6,539,303 | B2* | 3/2003 | McClure | G05D 1/0278 701/25 |
| 6,804,587 | B1* | 10/2004 | O Connor | E02F 9/205 701/50 |
| 10,299,422 | B2* | 5/2019 | Schleicher | A01M 7/0089 |
| 2003/0111546 | A1* | 6/2003 | Schaffter | A01M 7/0089 239/69 |
| 2012/0296529 | A1* | 11/2012 | Peake | A01B 69/008 701/50 |
| 2019/0128864 | A1* | 5/2019 | Pickett | A01C 21/007 |
| 2019/0357520 | A1 | 11/2019 | Redden et al. | |
| 2020/0230633 | A1 | 7/2020 | Serrat et al. | |
| 2020/0275645 | A1 | 9/2020 | Smith | |

OTHER PUBLICATIONS

"Spot Spraying from Agrifac", Agrifac product information page, dated 2021 (5 pages) https://www.agrifac.com/sustainable-farming/spot-spraying/.

Hill, "Intelligent Sprayer Targets Individual Weeds", Future Farming, dated Jul. 1, 2019 (6 pages) https://www.futurefarming.com/Machinery/Articles/2019/7/Intelligent-sprayer-targets-individual-weeds-440139E/.

"WeedSeeker 2 Spot Spray System", Trimble product information page, dated 2021 (10 pages) https://agriculture.trimble.com/product/weedseeker-2-spot-spray-system/.

"Compensating for Sprayer Boom Sway Right Down to Each Nozzle", RealAgriculture, TechTour Episode 23, dated Mar. 29, 2018. (2 pages) https://www.realagriculture.com/2018/03/techtour-compensating-for-sprayer-boom-sway-right-down-to-each-nozzle/.

"Weed-It Ag—Spot on Spraying", Weed-It Precision Spraying product information page, website accessed Apr. 1, 2021. (2 pages) https://www.weed-it.com/product.

Qamar Uz Zaman et al., "Development of Prototype Automated Variable Rate Sprayer for Real-Time Spot-Application of Agrichemicals in Wild Blueberry Fields" Computers and Electronics in Agriculture, vol. 76, Issue 2 dated Jan. 28, 2011 (10 pages) https://www.researchgate.net/publication/268747093_Prototype_Variable_Rate_Sprayer_for_Spot-Application_of_Agrochemicals_in_Wild_Blueberry.

"175-335 HP: Patriot Series Sprayers", Case IH Patriot Series product information page, website access Apr. 1, 2021. (16 pages) https://www.caseih.com/northamerica/en-us/products/application-equipment/patriot-series-sprayers.

Steward et al., "Distance-Based Control System for Machine Vision Based Selective Spraying", Iowa State University, Agricultural and Biosystems Engineering Publications, dated 2002. (10 pages) https://lib.dr.iastate.edu/cgi/viewcontent.cgi?referer=https://www.google.com/&httpsredir=1&article=1014&context=abe_eng_pubs.

* cited by examiner

SYSTEM AND METHOD FOR PERFORMING SPRAYING OPERATIONS WITH AN AGRICULTURAL APPLICATOR

FIELD

The present disclosure generally relates to agricultural applicators for performing spraying operations within a field and, more particularly, to systems and methods for performing spraying operations with an agricultural sprayer, such as spraying operations that allow for selective application of an agricultural product onto plants.

BACKGROUND

Agricultural sprayers apply an agricultural product (e.g., a pesticide, a nutrient, and/or the like) onto crops and/or a ground surface as the sprayer is traveling across a field. To facilitate such travel, sprayers can be configured as self-propelled vehicles or implements towed behind an agricultural tractor or another suitable work vehicle. In some instances, the sprayer includes an outwardly extending boom assembly having a plurality of boom sections supporting a plurality of spaced-apart nozzle assemblies. Each nozzle assembly has a valve configured to control the spraying of the agricultural product through a nozzle onto underlying targets, which may include crops and/or weeds. The boom assembly is disposed in a "cantilevered" arrangement during the spraying operation, wherein the boom sections are extended to cover wide swaths of the field. For transport, the boom assembly is folded to reduce the width of the sprayer.

Some sprayers may control the flow of agricultural product through individual nozzles based on data received from sensors mounted on the boom sections that detect one or more field conditions (e.g., crops, weeds, moisture content, etc.). However, under certain operating conditions, such as altering a direction of the vehicle, various offsets of the components of the sprayer may be formed based on the sprayer design and steering kinematics of the sprayer causing misapplications of the agricultural product.

Accordingly, an improved system and method for performing spraying operations with an agricultural sprayer would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for an agricultural sprayer. The system includes a boom assembly operably coupled with a chassis. The system also includes a steering system operably coupled with the chassis and including a steering sensor. The system further includes one or more imaging devices and one or more nozzle assemblies. A computing system is operably coupled with the one or more imaging devices and the one or more nozzle assemblies. The computing system is configured to receive data related to a first imaged portion of an agricultural field from the one or more imaging devices; identify a target within the first imaged portion of the agricultural field; receive data related to an inputted steering command from the steering system; determine a sprayer path; and determine a target offset of the target relative to the sprayer path and a boom offset of the assembly relative to the sprayer path.

In some aspects, the present subject matter is directed to a method for selectively applying an agricultural product. The method includes receiving data related to a first imaged portion of an agricultural field from an imaging device. The method also includes identifying a target within the first imaged portion of the agricultural field. The method further includes receiving data related to an inputted steering command from the steering system. In addition, the method includes determining a target offset relative to a sprayer path and determining a boom offset of a boom assembly relative to a sprayer path based at least on part on the data related to the inputted steering command. Lastly, the method includes activating a first nozzle assembly when a lateral offset is within a first range and a second nozzle assembly when the lateral offset is within a second range, wherein the first range is varied from the second range.

In some aspects, the present subject matter is directed to a system for an agricultural sprayer. The system includes a boom assembly operably coupled with a chassis. The system also includes a steering system operably coupled with the chassis and including a steering sensor. A computing system is operably coupled with the steering system. The computing system is configured to receive data related to an inputted steering command from the steering system and determine an offtrack width of the boom assembly relative to a sprayer path.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
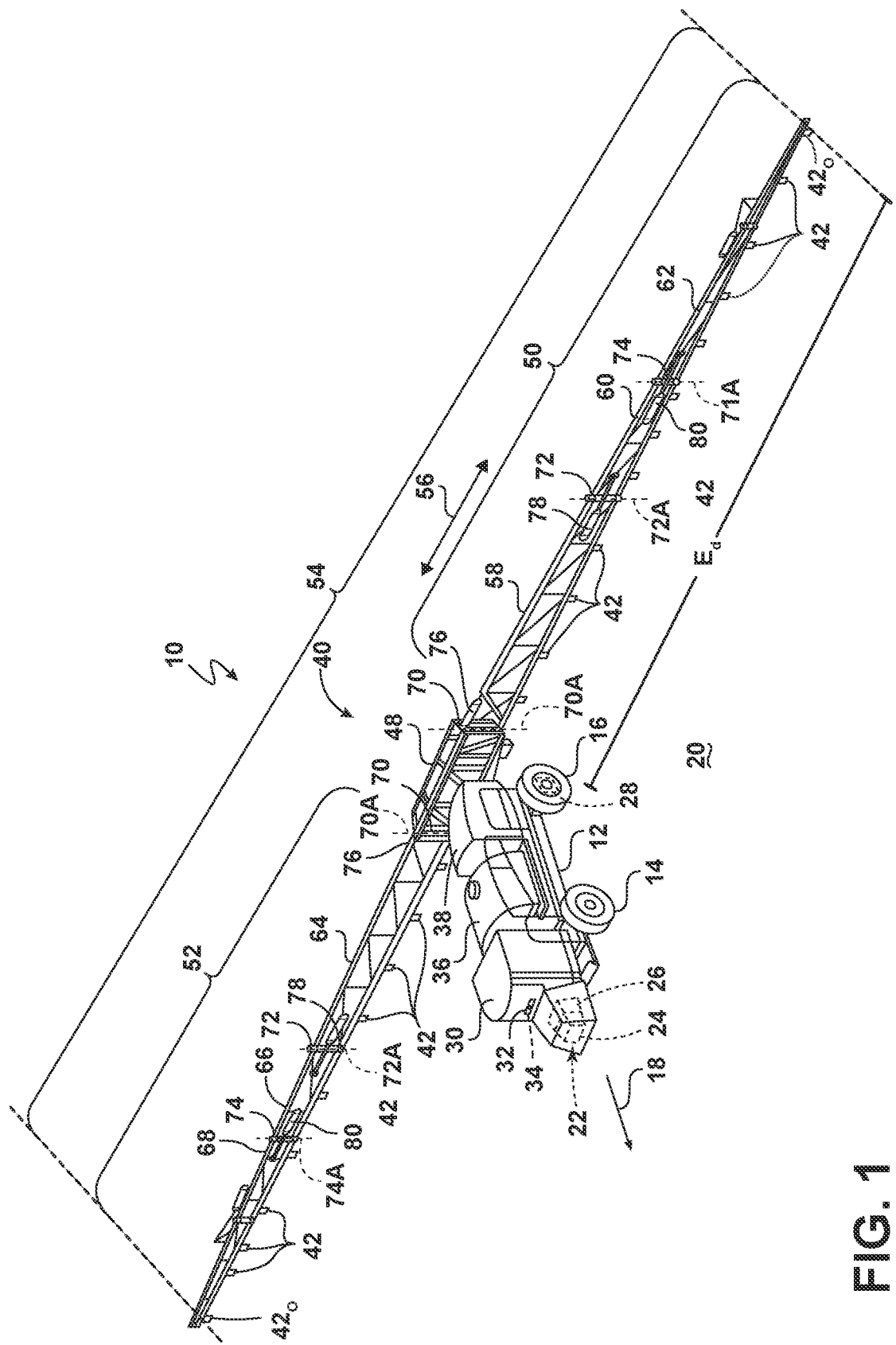
FIG. 1 illustrates a perspective view of an agricultural sprayer in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for an agricultural vehicle. The system may include a boom assembly operably coupled with a chassis. A steering system is operably coupled with the chassis and includes a steering sensor.

The system also includes one or more imaging devices and one or more nozzle assemblies. The one or more imaging devices and one or more nozzle assemblies may each be positioned along the boom assembly. In some instances, each of the one or more imaging devices may be associated with a respective nozzle assembly of the one or more nozzle assemblies.

The system further includes a computing system operably coupled with the one or more imaging devices and the one or more nozzle assemblies. The computing system may be configured to receive data related to a first imaged portion of an agricultural field from the one or more imaging devices. In turn, the computing system may be configured to identify a target within the first imaged portion of the agricultural field. In addition, computing system may be configured to receive data related to an inputted steering command from the steering system and determine a target offset of the target relative to the sprayer path and a boom offset of the assembly relative to the sprayer path.

Based least in part on a boom offset angle relative to the sprayer path, the target offset, the boom offset, the computing system may be configured to determine an activation time of the valve based at least in part on a boom offset angle relative to the sprayer path. In addition, the computing system may also be configured to determine a lateral distance along the boom assembly from a reference point to a lateral position of the target along the boom assembly at the activation time. At the activation time, the computing system may activate a nozzle assembly that correlates to the lateral distance. As such, the system provided herein may account for lateral offsets of the boom assembly relative to the sprayer path thereby increasing the accuracy of the system.

Figure 2:
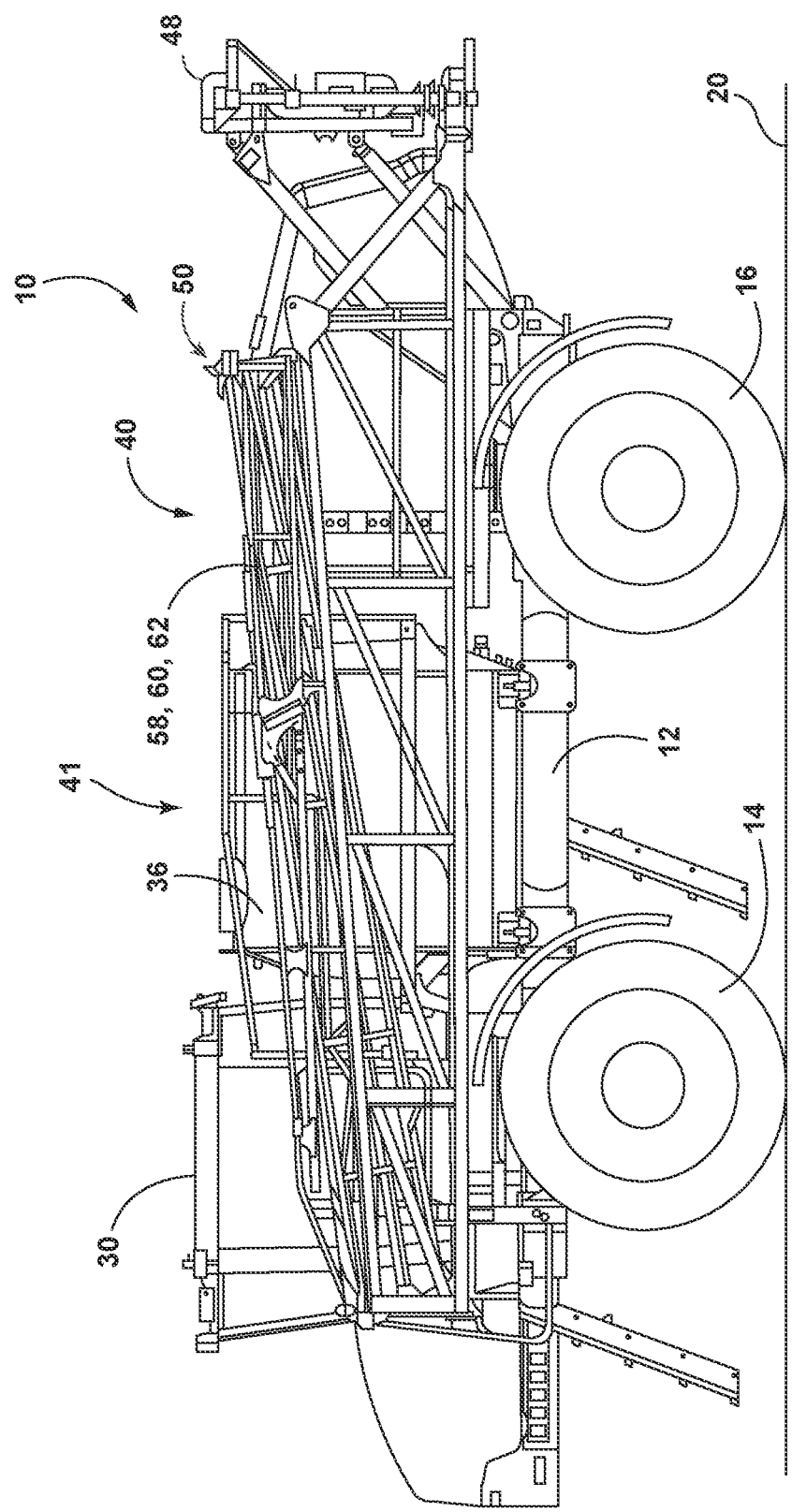
FIG. 2 illustrates a side view of the agricultural sprayer in accordance with aspects of the present subject matter.

Referring now to FIGS. 1 and 2, an agricultural applicator is generally illustrated as a self-propelled agricultural sprayer 10. However, in alternative embodiments, the agricultural applicator may be configured as any other suitable type of the agricultural applicator configured to perform an agricultural spraying or other product application operations, such as a tractor or other work vehicle configured to haul or tow an applicator implement.

In some embodiments, such as the one illustrated in FIG. 1, the agricultural sprayer 10 may include a chassis 12 configured to support or couple to a plurality of components. For example, front and rear wheels 14, 16 may be coupled to the chassis 12. The wheels 14, 16 may be configured to support the agricultural sprayer 10 relative to a ground surface and move the agricultural sprayer 10 in a direction of travel (e.g., as indicated by arrow 18 in FIG. 1) across a field 20. In this regard, the agricultural sprayer 10 may include a powertrain control system 22, that includes a power plant 24, such as an engine, a motor, or a hybrid engine-motor combination, a transmission system 26 configured to transmit power from the engine to the wheels 14, 16, and/or a brake system 28.

The chassis 12 may also support a cab 30, or any other form of operator's station, that houses various control or input devices (e.g., levers, pedals, control panels, buttons, and/or the like) for permitting an operator to control the operation of the sprayer 10. For instance, as shown in FIG. 1, the agricultural sprayer 10 may include a user interface 32, such as a human-machine interface (HMI), for providing messages and/or alerts to the operator and/or for allowing the operator to interface with the vehicle's controller through one or more user-input devices 34 (e.g., levers, pedals, control panels, buttons, and/or the like) within the cab 30 and/or in any other practicable location.

Figure 3:
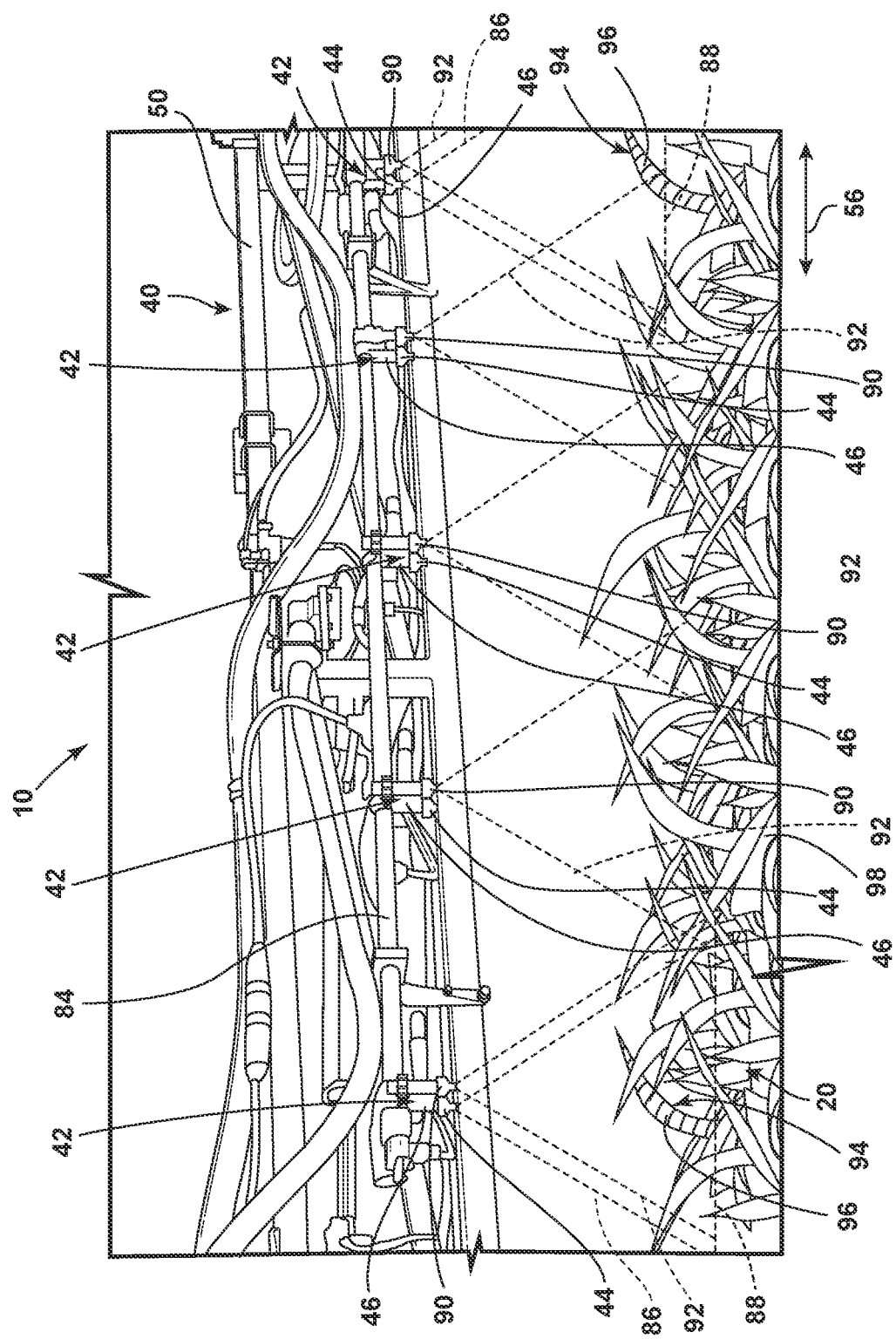
FIG. 3 is a front perspective view of the boom assembly including a plurality of nozzle assemblies positioned there along in accordance with aspects of the present subject matter.

The chassis 12 may also support a product system 41. The product system 41 can include one or more tanks, such as a product tank 36 and/or a rinse tank 38. The product tank 36 is generally configured to store or hold an agricultural product, such as pesticides (e.g., herbicides, insecticides, rodenticides, etc.) and/or nutrients. The agricultural product is conveyed from the product tank 36 and/or the rinse tank 38 through a product circuit including numerous plumbing components, such as interconnected pieces of tubing, for release onto the underlying field 20 (e.g., plants and/or soil) through one or more nozzle assemblies 42 mounted on the boom assembly 40 (or the sprayer 10). Each nozzle assembly 42 may include, for example, a spray nozzle 44 (FIG. 3) and an associated valve 46 (FIG. 3) for regulating the flow rate of the agricultural product through the nozzle 44 (and, thus, the application rate of the nozzle assembly 42), thereby allowing the desired spray characteristics of the output or spray fan of the agricultural product expelled from the nozzle 44 to be achieved. In some instances, each valve 46 may be selectively activated to direct an agricultural product towards a defined target 94 (FIG. 3). For instance, each valve 46 may be selectively activated to deposit a suitable herbicide towards a detected/identified weed and/or a nutrient towards a detected/identified crop.

The chassis 12 may further support a boom assembly 40 that can include a frame 48 that supports first and second boom arms 50, 52, which may be orientated in a cantilevered nature. The first and second boom arms 50, 52 are generally movable between an operative or unfolded position (FIG. 1) and an inoperative or folded position (FIG. 2). When distributing the agricultural product, the first boom arm and/or the second boom arm 50, 52 extends laterally outward from the agricultural sprayer 10 to the operative position in order to cover wide swaths of the underlying ground surface, as illustrated in FIG. 1. When extended, each boom arm 50, 52 defines an extension distance $E_d$ defined between the frame 48 and an outer end portion of the boom arms 50, 52. Further, the boom arms 50, 52, when both unfolded, define a field swath 54 between respective outer nozzle assemblies $42_o$ of the first and second boom arms 50, 52 that is generally commensurate with an area of the field 20 to which the agricultural sprayer 10 covers during a pass across a field 20 to perform the agricultural operation. However, it will be appreciated that in some embodiments, a single boom arm 50, 52 may be utilized during the application operation. In such instances, the field swath 54 may be an area defined between a pair of nozzle assemblies 42 that are furthest from one another in a lateral direction 56.

To facilitate transport, each boom arm 50, 52 of the boom assembly 40 may be independently folded forwardly or rearwardly into the inoperative position, thereby reducing the overall width of the sprayer 10, or in some examples, the overall width of a towable implement when the applicator is configured to be towed behind the agricultural sprayer 10.

Each boom arm 50, 52 of the boom assembly 40 may generally include one or more boom sections. For instance, in the illustrated embodiment, the first boom arm 50 includes three boom sections, namely a first inner boom section 58, a first middle boom section 60, and a first outer boom section 62, and the second boom arm 52 includes three boom sections, namely a second inner boom section 64, a second middle boom section 66, and a second outer boom section 68. In such an embodiment, the first and second inner boom sections 58, 64 may be pivotably coupled to the frame 48. Similarly, the first and second middle boom sections 60, 66 may be pivotably coupled to the respective first and second inner boom sections 58, 64, while the first and second outer boom sections 62, 68 may be pivotably coupled to the respective first and second middle boom sections 60, 66. For example, each of the inner boom sections 58, 64 may be pivotably coupled to the frame 48 at pivot joints 70. Similarly, the middle boom sections 60, 66 may be pivotally coupled to the respective inner boom sections 58, 64 at pivot joints 72, while the outer boom sections 62, 68 may be pivotably coupled to the respective middle boom sections 60, 66 at pivot joints 74.

As is generally understood, pivot joints 70, 72, 74 may be configured to allow relative pivotal motion between the adjacent boom sections of each boom arm 50, 52. For example, the pivot joints 70, 72, 74 may allow for articulation of the various boom sections between a fully extended or working position (e.g., as shown in FIG. 1), in which the boom sections are unfolded along the lateral direction 56 of the boom assembly 40 to allow for the performance of an agricultural spraying operation, and a transport position (FIG. 2), in which the boom sections are folded inwardly to reduce the overall width of the boom assembly 40 along the lateral direction 56. It should be appreciated that, although each boom arm 50, 52 is shown in FIG. 1 as including three individual boom sections coupled along opposed sides of the central boom section, each boom arm 50, 52 may generally have any suitable number of boom sections.

Additionally, as shown in FIG. 1, the boom assembly 40 may include inner fold actuators 76 coupled between the inner boom sections 58, 64 and the frame 48 to enable pivoting or folding between the fully-extended working position and the transport position. For example, by retracting/extending the inner fold actuators 76, the inner boom sections 58, 64 may be pivoted or folded relative to the frame 48 about a pivot axis 70A defined by the pivot joints 70. Moreover, the boom assembly 40 may also include middle fold actuators 78 coupled between each inner boom section 58, 64 and its adjacent middle boom section 60, 66 and outer fold actuators 80 coupled between each middle boom section 60, 66 and its adjacent outer boom section 62, 68. As such, by retracting/extending the middle and outer fold actuators 78, 80, each middle and outer boom section 60, 66, 62, 68 may be pivoted or folded relative to its respective inwardly adjacent boom section 58, 64, 60, 66 about a respective pivot axis 72A, 74A. When moving to the transport position, the boom assembly 40 and fold actuators 76, 78, 80 are typically oriented such that the pivot axes 70A, 72A, 74A are generally parallel to the vertical direction and, thus, the various boom sections 58, 64, 60, 66, 62, 68 of the boom assembly 40 are configured to be folded horizontally (e.g., parallel to the lateral direction 56) about the pivot axes 70A, 72A, 74A to keep the folding height of the boom assembly 40 as low as possible for transport. However, the pivot axes 70A, 72A, 74A may be oriented along any other suitable direction.

Referring now to FIG. 3, a front perspective view of the boom assembly 40 including a plurality of nozzle assemblies 42 positioned there along is illustrated in accordance with aspects of the present subject matter. In some embodiments, each nozzle assembly 42 may be configured to dispense the agricultural product stored within the product tank 36 (FIG. 1) and/or the rinse tank 38 (FIG. 1) onto a target 94. In several embodiments, the nozzle assemblies 42 may be mounted on and/or coupled to the first and/or second boom arms 50, 52 of the boom assembly 40, with the nozzle assemblies 42 being spaced apart from each other along the lateral direction 56. Furthermore, fluid conduits 84 may fluidly couple the nozzle assemblies 42 to the tank 36 and/or the rinse tank 38. In this respect, as the sprayer 10 travels across the field 20 in the direction of forward travel 18 (FIG. 1) to perform a spraying operation, the agricultural product moves from the product tank 36 through the fluid conduits to each of the nozzle assemblies 42. The nozzles 44 may, in turn, dispense or otherwise spray a fan 86 of the agricultural product onto the target 94 when the target 94 is in an application region 88 that corresponds to an area for which the agricultural product deposited from the nozzle 44 may contact. In various instances, the application region 88 may be varied based on various factors, which can include, but are not limited to, sprayer conditions (e.g., speed of the sprayer 10, the direction of forward travel 18 of the sprayer 10, acceleration of the sprayer 10, etc.), boom conditions (e.g., speed of the nozzle assembly 42, deflection magnitude of the assembly 42 from a default position, acceleration of the nozzle assembly 42, direction of movement of the nozzle assembly 42 relative to the frame 48 and/or the underlying field 20, etc.), environmental conditions (e.g., wind speed, wind direction, percent humidity, ambient temperature, etc.), and/or any other conditions.

In some embodiments, the nozzle assembly 42 may include one or more nozzles 44 having varied spray characteristics. As such, the nozzle assembly 42 may vary the application region 88 based on the selected nozzle 44. In various examples, the nozzles 44 within each nozzle assembly 42 may correspond to flat fan nozzles configured to dispense a flat fan of the agricultural product. However, in alternative embodiments, the nozzles 44 may correspond to any other suitable types of nozzles, such as dual pattern nozzles and/or hollow cone nozzles.

As shown, the boom assembly 40 may further include one or more imaging devices 90 configured to capture data indicative of field conditions within the field 20. In several embodiments, the imaging devices 90 may be installed or otherwise positioned on the boom assembly 40. As such, each imaging device 90 may have a field of view or detection zone 92 (e.g., as indicated by dashed lines in FIG. 3). In this regard, each imaging device 90 may be able to capture data indicative of objects and/or field conditions within its detection zone 92. For instance, in some embodiments, the imaging devices 90 are object detecting/identifying imaging devices, where the data captured by the imaging devices 90 may be indicative of the location and/or type of plants and/or other objects within the field 20. More particularly, in some embodiments, the data captured by the imaging devices 90 may be used to allow various objects to be detected. For example, the data captured may allow a computing system 202 to distinguish weeds 96 from useful plants within the field 20 (e.g., crops 98). In such instances, the imaging device data may, for instance, be used within a spraying operation to selectively spray or treat a defined target 94, which may include the detected/identified weeds 96 (e.g., with a suitable herbicide) and/or the detected/identified crops 98 (e.g., with a nutrient).

It should be appreciated that the agricultural sprayer 10 may include any suitable number of imaging devices 90 and should not be construed as being limited to the number of imaging devices 90 shown in FIG. 3. Additionally, it should be appreciated that the imaging devices 90 may generally correspond to any suitable sensing devices. For example, each imaging device 90 may correspond to any suitable cameras, such as single-spectrum camera or a multi-spectrum camera configured to capture images, for example, in the visible light range and/or infrared spectral range. Additionally, in various embodiments, the cameras may correspond to a single lens camera configured to capture two-dimensional images or a stereo camera having two or more lenses with a separate image imaging device 90 for each lens to allow the cameras to capture stereographic or three-dimensional images. Alternatively, the imaging devices 90 may correspond to any other suitable image capture devices and/or other imaging devices capable of capturing "images" or other image-like data of the field 20. For example, the imaging devices 90 may correspond to or include radio detection and ranging (RADAR) sensors, light detection and ranging (LIDAR) sensors, and/or any other practicable device.

Figure 4:
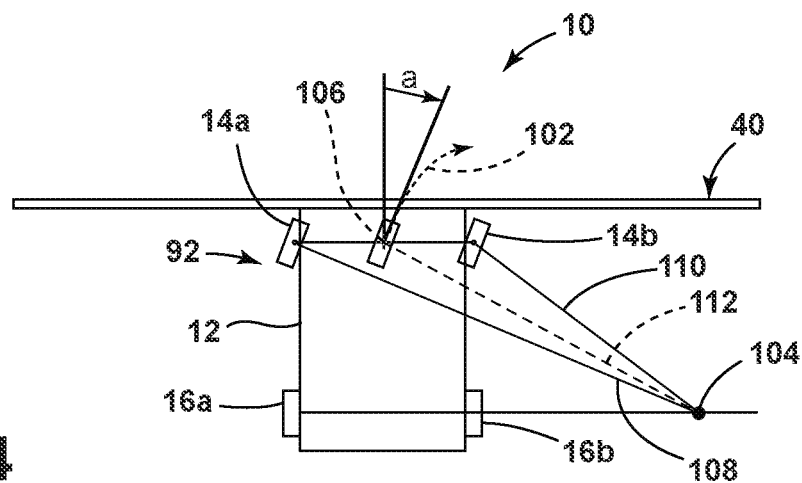
FIG. 4 is a schematic illustration of the sprayer having a pair of front steered wheels in accordance with aspects of the present subject matter.
Figure 5:
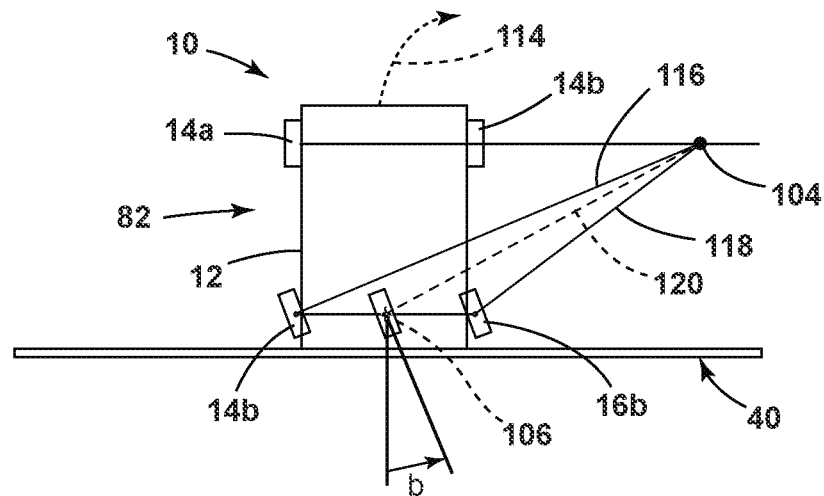
FIG. 5 is a schematic illustration of the sprayer having a pair of rear steered wheels in accordance with aspects of the present subject matter.
Figure 6:
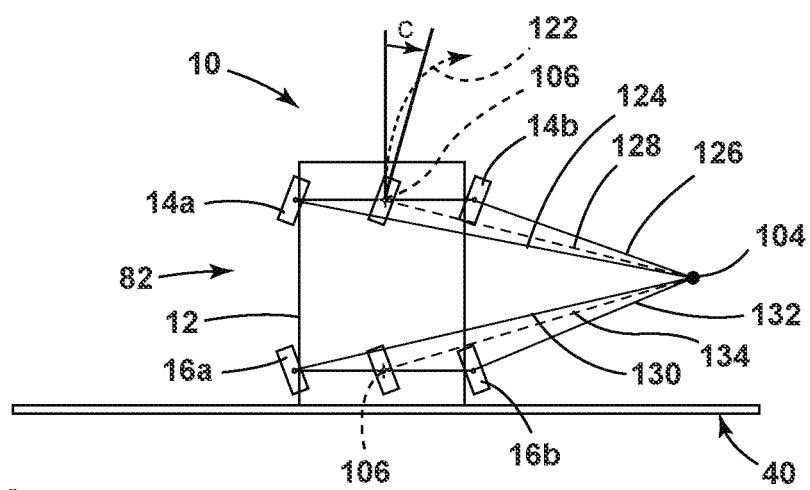
FIG. 6 is a schematic illustration of the sprayer having a pair of front steered wheels and a pair of rear steered wheels in accordance with aspects of the present subject matter.

Referring to FIGS. 4-6, various steering systems 82 that may be implemented by the sprayer 10 are schematically illustrated. Specifically, FIG. 4 illustrates the sprayer 10 having a pair of front steered wheels 14a, 14b, FIG. 5 illustrates the sprayer 10 having a pair of rear steered wheels 16a, 16b, and FIG. 6 illustrates the sprayer 10 having a pair of front steered wheels 14a, 14b and a pair of rear steered wheels 16a, 16b.

In the embodiments of FIGS. 4-6, the sprayer 10 includes a chassis 12 and a boom assembly 40. As illustrated in FIG. 4, the boom assembly 40 may be mounted fore of the chassis 12 and/or one or more sets of wheels 14a, 14b, 16a, 16b of the sprayer 10. Additionally or alternatively, the boom assembly 40 may be mounted aft of the chassis 12 and/or one or more sets of wheels 14a, 14b, 16a, 16b of the sprayer 10.

With further reference to FIG. 4, a sprayer 10 is shown undergoing two-wheel, front-wheel steering toward the right, as indicated by dash-dot-dot arrow 102. For this right turn, according to Ackerman steering principles, the inside front right wheel 14b is turned at a tighter angle than an outside front left wheel 14a, to account for the front right wheel 14b negotiating a tighter radius turn than the outside wheel 14a. A radius of rotation of the non-steering wheels 16a, 16b, a radius of rotation 110 of the front right wheel 14b, a radius of rotation 108 of the front left wheel 14a, and a radius 112 from a reference location 106 intersect at a turning center 104 (alternatively can be called the "Ackerman center point"). The sprayer 10 rotates about the turning center 104. It will be appreciated that the terms "inside" wheel and "outside" wheel are relative to the turning center 104. As such, when the sprayer 10 makes a right turn, the right wheels are the inside wheels, and the left wheels are the outside wheels. Conversely, when the sprayer 10 makes a left turn, the left wheels are the inside wheels and the right wheels are the outside wheels.

A steering angle, a, relative to a reference location 106 is defined between the front wheels 14a, 14b. The reference location 106 is a conceptual point that is used for representing kinematic modeling of the sprayer path 142. In such instances, a steering angle of the sprayer 10 may be calculated from the reference location 106. Based on the position of the front wheels 14a, 14b with respect to the reference location 106, steering angles for the steered wheels 14a, 14b of the sprayer 10 can be computed. It will be appreciated that to achieve the kinematic modeling discussed herein, certain assumptions may be made with regard to parameters associated with the sprayer 10. Examples of such assumptions include, but are not limited to, the sprayer 10 being operated at a relatively low speed, wheels of the sprayer 10 having negligible (e.g., no) slip, tires of the sprayer 10 having negligible (e.g., no) lateral compliance, tires of the sprayer 10 having negligible (e.g., no) deformation, actuator dynamics of the sprayer 10 being negligible, and the sprayer 10 exhibiting negligible (e.g., no) roll or pitch motions, among other conceivable factors with the potential to affect a sprayer path 142.

With reference to FIG. 5, a sprayer 10 is shown undergoing two-wheel, rear-wheel steering toward the right, as indicated by dash-dot-dot arrow 114. In such embodiments, the reference location 106 may be defined between the left rear wheel 16a and the right rear wheel 16b. As illustrated, a radius of rotation of the non-steering wheels 14a, 14b, a radius of rotation 116 of the rear left wheel 16a, a radius of rotation 118 of the rear right wheel 16b, and a radius 120 from the reference location 106 intersect at a turning center 104.

A steering angle, b, relative to a reference location 106 is defined between the rear wheels 16a, 16b. The reference location 106 is a conceptual point that is used for representing kinematic modeling of the sprayer path 142. In such instances, a steering angle of the sprayer 10 may be calculated from the reference location 106. Based on the position of the rear wheels 16a, 16b with respect to the reference location 106, steering angles for the steered wheels 16a, 16b of the sprayer 10 can be computed.

In FIG. 6, a sprayer 10 is shown undergoing four-wheel steering toward the right, as indicated by dash-dot-dot arrow 122. A radius 124 from the left front wheel 14a, a radius 126 from the right front wheel 14b, and a radius 128 from the reference location 106 intersect at a turning center 104. Similarly, a radius 130 from the left rear wheel 16a, a radius 132 from the right rear wheel 16b, and a radius 134 from the reference location 106 may also intersect at a turning center 104.

A steering angle, c, can be computed for the reference location 106, which can be located either between the front wheels 14a, 14b or the rear wheels 16a, 16b. The steering angle is a single angle used to represent the sprayer path 142. From the steering angle, steering angles for all the wheels 14a, 14b, 16a, 16b can be computed, based on their position with respect to the reference location 106. In FIG. 6, a reference location 106 is shown both in between the front wheels 14a, 14b and rear wheels 16a, 16b of the sprayer 10. Either location of the reference location 106 can be used. Similarly, for FIGS. 4 and 5, the reference location 106 can be located at a different location than shown, 70 and 88, respectively. As described above, steering angles are computed for all the steered wheels 14a, 14, 16a, 16b based on the steering angle of the reference location 106 and the location of the steered wheel 14a, 14, 16a, 16b with respect to the reference location 106. For the turn shown in FIG. 4, the left front wheel 14a travels along a larger diameter circle than the right front wheel 14b. Similarly, the left rear wheel 16a travels on a circle of a larger diameter than the right rear wheel 16b. It will be appreciated that although the drawings of FIG. 4-6 illustrate various steering systems 82 based on the Ackerman angle, other steering system 82 are also contemplated without departing from the scope of the present disclosure.

Figure 7:
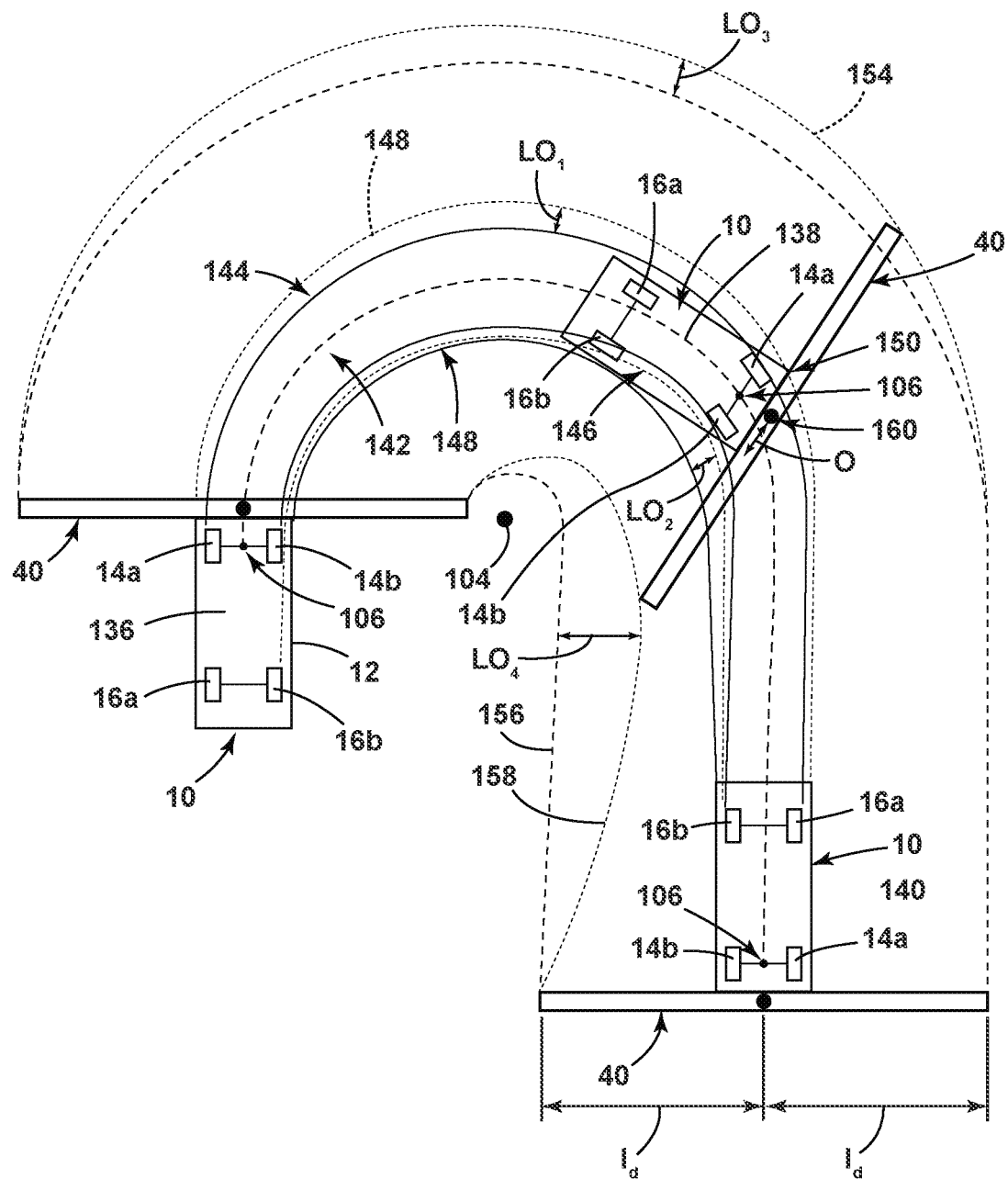
FIG. 7 is a schematic illustration of the sprayer having a front-mounted boom assembly traversing a right turn in accordance with aspects of the present subject matter.

Referring now to FIG. 7, a schematic drawing of the sprayer 10 having a chassis 12, a pair of steered front wheels 14a, 14, a pair of fixed rear wheels 16a, 16b and a boom assembly 40 positioned at least partially fore of the front steered wheels 14a, 14 is schematically illustrated. It will be appreciated that the sprayer 10 may have other configurations without departing from the scope of the present disclosure. For example, as provided herein the rear wheels 16a, 16b may be steered in addition to or in lieu of the front wheels 14a, 14 being steered. In addition, the sprayer 10 may include a boom assembly 40 at least partially aft of the chassis 12 and/or the rear wheels 16a, 16b in addition to or in lieu of the fore boom assembly 40.

As illustrated in FIG. 7, the sprayer 10 may be positioned in a first position 136. From the first position 136, the sprayer 10 may be moved to a second position 138 in which the direction of the sprayer 10 is altered by the steering system 82 between the first position 136 and the second position 138. From the second position 138, the steering system 82 may be configured to further alter the direction of the sprayer 10 to a third position 140 such that the sprayer 10 generally completes a U-turn. However, it will be appreciated that the sprayer 10 may make move along any other path without departing from the scope of the present disclosure.

As the sprayer 10 moves from the first position 136 to the second position 138 and onward to the third position 140, the reference location 106 defines a sprayer path 142. In some instances, the vehicle path may be defined by a covered sprayer path 142 and a projected sprayer path 142 based on a steering input of the sprayer 10. As the radius of curvature for each wheel 14a, 14, 16a, 16b of the sprayer 10 from the turning center 104 is varied from one another, each wheel 14a, 14, 16a, 16b can create a unique arc of travel relative to the sprayer path 142. For example, the left front wheel 14a may define a path of travel 144 on an outer side of the sprayer path 142. Conversely, the rear right wheel 14b may define a path of travel 146 that is inwards, or on an opposing side, of the sprayer path 142 from the path of travel 144 the front left wheel 14a.

Due to a portion of the sprayer 10 being fore of the steered wheels 14a, 14b, a path of overhang 148 may be outward of the path of travel 144 of the left front wheel 14a. As such, a front portion 150 of the sprayer 10 may be laterally offset from the sprayer path 142. In some instances, a lateral overhang $LO_1$ may be defined between the path of travel 144 of the left front wheel 14a and the path of overhang 148. Likewise, due to a portion of the sprayer 10 being aft and/or laterally outward of the non-steered wheels 16a, 16b, a path of overhang 148 may also be inward of the path of travel 146 of the right rear wheel 16b. As such, a side portion of the sprayer 10 may be laterally offset from the sprayer path 142. In some instances, a lateral overhang $LO_2$ may be defined between the path of travel 146 of the right rear wheel 16b and the path of overhang 148.

Moreover, reference lines 152, 156 are illustrated extending a lateral distance Id from the sprayer path 142. The lateral distance $l_d$ may be generally equal to the length of equal halves of the boom assembly 40 from a reference point 160 of the boom assembly 40, which may define a center point of the boom assembly 40 in a lateral direction 56. However, as the boom assembly 40 is mounted fore of the chassis 12, the boom assembly 40 may move laterally relative to the reference lines as the sprayer 10 traverses a non-linear path. In such instances, the boom assembly 40 may move along an offtrack path, which is generally illustrated by lines 154 and 158. As such, as the sprayer 10 moves between the first and third positions 136, 140, various amounts of offset $LO_3$, $LO_4$ are present on opposing sides of the boom assembly 40 relative to reference lines 152, 156. In some instances, a boom offset may be defined as an offset O between the reference point 160 of the boom assembly 40 and the sprayer path 142. In addition to the boom assembly 40 is offset from the sprayer path 142, the boom assembly 40 may be non-perpendicular to the sprayer path 142, which may be defined as an offset angle between the boom assembly 40 and the sprayer path 142.

In various embodiments, the sprayer 10 may be configured to determine the boom offset relative to the sprayer path 142. In turn, the boom offset may be used to determine an appropriate nozzle assembly 42 to deposit the agricultural product on a defined target 94. In various embodiments, the boom offset may be determined through various geometric equations, lookup tables (LUTs), and/or any other method. Furthermore, the sprayer 10 may also determine and/or predict a boom offset relative to the sprayer path 142 at some future time based on the current lateral offset of the boom assembly 40, steering inputs, and/or any other input. In some instances, by determining a lateral offset of the boom assembly 40, the accuracy of the application of the agricultural product to defined targets 94 may be increased.

Figure 8:
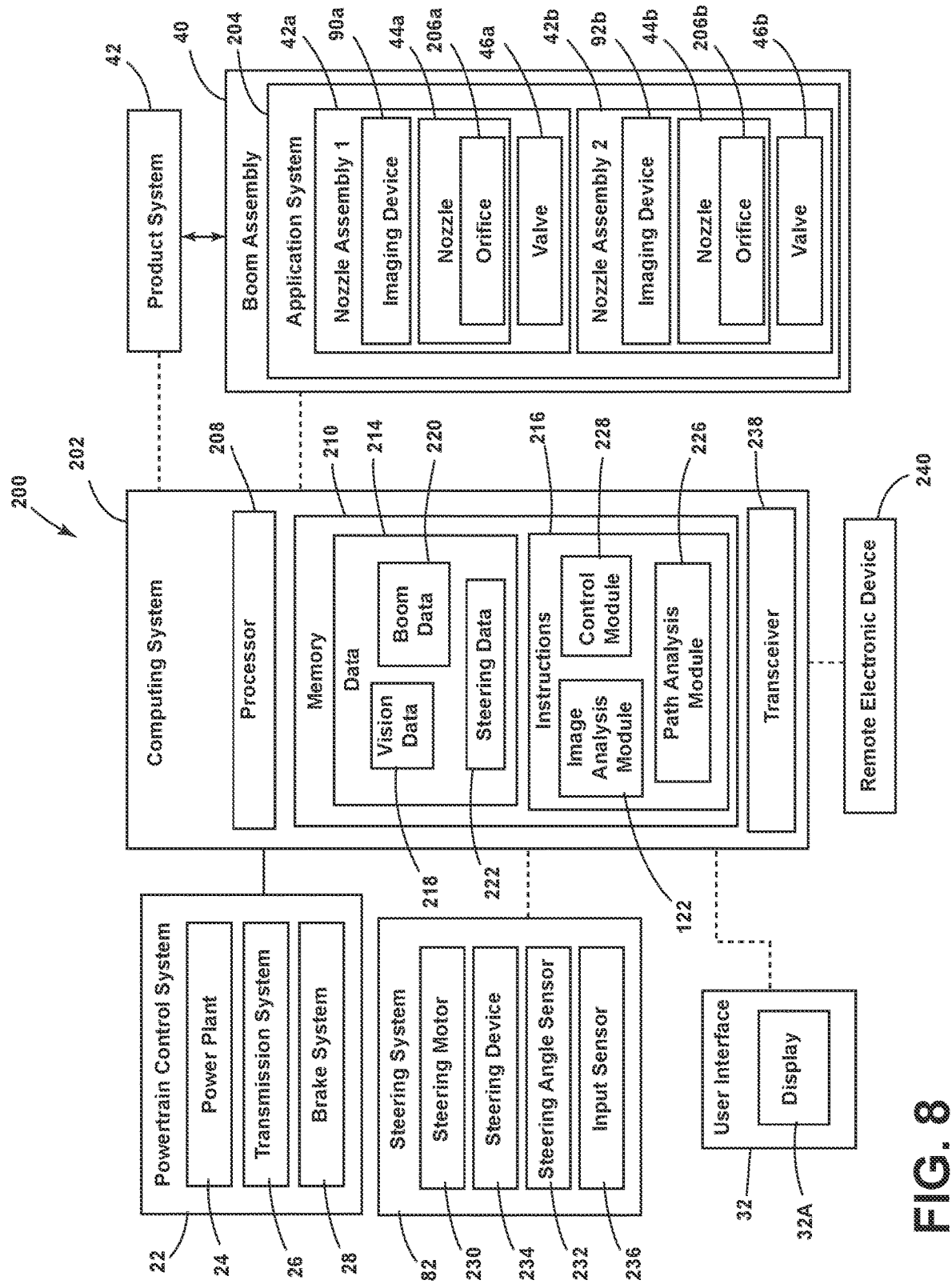
FIG. 8 illustrates a block diagram of components of a system for selectively applying an agricultural product in accordance with aspects of the present subject matter.

Referring now to FIG. 8, a schematic view of a system for operating the sprayer 10 that is configured to apply agricultural product to defined targets 94 is illustrated in accordance with aspects of the present subject matter. In general, the system 200 will be described with reference to the sprayer 10 described above with reference to FIGS. 1-7. However, it should be appreciated by those of ordinary skill in the art that the disclosed system 200 may generally be utilized with agricultural machines having any other suitable machine configuration. Additionally, it should be appreciated that, for purposes of illustration, communicative links, or electrical couplings of the system 200 shown in FIG. 8 are indicated by dashed lines.

As shown in FIG. 8, the system 200 may include a computing system 202 operably coupled with an agricultural product application system 204 that may be configured to dispense an agricultural product from the product system 41 to the field 20 through one or more nozzle assemblies 42a, 42b that is positioned at least partially along the boom assembly 40. As illustrated in FIG. 8, in some instances, the application system 204 can include first and second nozzle assemblies 42a, 42b. However, it will be appreciated that the application system 204 can include any number of nozzle assemblies 42a, 42b without departing from the scope of the present disclosure.

In some embodiments, the first nozzle assembly 42a may be positioned along the boom assembly 40. The first nozzle assembly 42a can include a first valve 46a operably coupled with a first nozzle 44a and configured to control a flow of agricultural product through the first nozzle 44a. A second nozzle assembly 42b may be laterally offset from the first nozzle assembly 42a along the boom assembly 40. The second nozzle assembly 42b can include a second valve 46b operably coupled with a second nozzle 44b and configured to control a flow of agricultural product through the second nozzle 44b.

The first and second nozzles 44a, 44b each define an orifice 206a, 206b that may dispense a fan 86 (FIG. 3) of the agricultural product. In some instances, the computing system 202 may be configured to distinguish various objects within the field 20 (e.g., weeds 96 (FIG. 3) from useful plants). In such instances, the application system 204 may perform a spraying operation to selectively spray or treat the defined target 94 from select nozzles 44a, 44b based on the target 94 being positioned within an application region 88 of the respective nozzle 44a, 44b.

In several embodiments, each nozzle 44a, 44b may include a respective valve 46a, 46b for activating the respective nozzle 44a, 44b when a target 94 is detected and determined to be present within an application region 88 of the nozzle 44a, 44b. The valves 46a, 46b can further include restrictive orifices, regulators, and/or the like to regulate the flow of agricultural product from the product tank 36 and/or the rinse tank 38 to each orifice 206a, 206b. In various embodiments, the valves 46a, 46b may be configured as electronically controlled valves that are controlled by a Pulse Width Modulation (PWM) signal for altering the application rate of the agricultural product.

In addition, one or more imaging devices 90a, 90b may be associated with each respective nozzle 44a, 44b and configured to capture images of a portion of the field 20 (FIG. 1). In various embodiments, each imaging device 90a, 90b may have a detection zone 92 (FIG. 3) that at least partially overlaps with an application region 88 (FIG. 3) of a nozzle 44*a*, 44*b* such that the imaging device 90*a*, 90*b* can provide data related to an object being positioned externally and/or internally of the application region 88 of the fan 86. As indicated above, in several embodiments, the one or more imaging devices 90*a*, 90*b* may correspond to a camera for capturing two-dimensional and/or three-dimensional images of the field 20. In several embodiments, the computing system 202 may be configured to receive and process data captured by the imaging devices 90*a*, 90*b* to allow one or more objects within imaged portions of the field 20 to be determined. For instance, the computing system 202 may be configured to execute one or more suitable image processing algorithms for identifying one or more targets 94 and/or one or more reference objects within the data provided to the computing system 202. In turn, based on the reference object within successive frames of data (i.e., two imaged portions of the field 20 that are sensed at off-set times), the computing system 202 may utilize geometric equations, lookup tables (LUTs), and/or any other method to determine a lateral offset of the boom assembly 40, which may be due to the sprayer 10 operating along a non-linear sprayer path 142. Based on the lateral offset, the selection of the nozzle assembly 42 to be used may be altered, and/or the timing of the deposition of the agricultural product may be altered to selectively spray the target 94.

In general, the computing system 202 may comprise any suitable processor-based device, such as a computing device or any suitable combination of computing devices. Thus, in several embodiments, the computing system 202 may include one or more processors 210 and associated memory devices 212 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory devices 212 of the computing system 202 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 212 may generally be configured to store information accessible to the processor 210, including data 214 that can be retrieved, manipulated, created, and/or stored by the processor 210 and instructions 216 that can be executed by the processor 210, when implemented by the processor 210, configure the computing system 202 to perform various computer-implemented functions, such as one or more aspects of the image processing algorithms and/or related methods described herein. In addition, the computing system 202 may also include various other suitable components, such as a communications circuit or module, one or more input/output channels, a data/control bus, and/or the like.

It will be appreciated that, in several embodiments, the computing system 202 may correspond to an existing controller of the agricultural sprayer 10, or the computing system 202 may correspond to a separate processing device. For instance, in some embodiments, the computing system 202 may form all or part of a separate plug-in module or computing device that is installed relative to the sprayer 10 or boom assembly 40 to allow for the disclosed system 200 and method to be implemented without requiring additional software to be uploaded onto existing control devices of the sprayer 10 or the boom assembly 40.

In several embodiments, the data 214 may be information received and/or generated by the computing system 202 that is stored in one or more databases. For instance, as shown in FIG. 8, the memory device 212 may include a vision database 218 for storing vision-based data received from the imaging devices 90*a*, 90*b*. For example, the imaging devices 90*a*, 90*b* may be configured to continuously or periodically capture images of the field 20 or other image-like data associated with the field 20. In such embodiments, the data transmitted to the computing system 202 from the imaging devices 90*a*, 90*b* may be stored within the vision database 218 for subsequent processing and/or analysis. It should be appreciated that, as used herein, the terms vision-based data or image-like data may include any suitable type of data received from the imaging devices 90*a*, 90*b* that allows for the objects and/or field conditions of a field 20 to be analyzed, including photographs or other images, RADAR data, LIDAR data, and/or other image-related data (e.g., scan data and/or the like).

Further, as shown in FIG. 8, the memory 212 may include a boom database 220, which may be configured to store data and/or algorithms related to one or more boom assemblies that may be used by the system 200. For example, the boom database 220 may be configured to receive inputs related to and/or detect various boom characteristics, such as a length of the boom, a number of nozzles 44*a*, 44*b* along the boom, and/or any other data. In addition, the boom database 220 may include various algorithms, LUTs, etc. that are associated with each boom based on the boom characteristics.

Additionally or alternatively, as shown in FIG. 8, the memory 212 may also include a steering database 222, which may be configured to store data and/or algorithms related to the steering system 82. For instance, the steering system 82 may provide data related to a previous and current steering angles for subsequent processing and/or analysis.

In several embodiments, the instructions 216 stored within the memory 212 of the computing system 202 may be executed by the processor 210 to implement an image analysis module 224. In general, the image analysis module 224 may be configured to process/analyze the images received from the imaging devices 90*a*, 90*b*, and/or the data deriving therefrom to estimate or determine offsets. Specifically, in several embodiments, the image analysis module 224 may be configured to execute one or more image processing algorithms to determine a target offset. For example, in some embodiments, the image analysis module 224 may receive one or more imaged portions of the field 20 from the imaging devices 90*a*, 90*b*, determine a reference object within the image portions of the field 20, determine a speed of the reference object, and determine a direction of the reference object. Based on the speed and direction of the reference objects determined by the imaging devices 90*a*, 90*b* along the boom assembly 40 and a known position of the imaging devices 90*a*, 90*b* along the boom, a magnitude of boom offset, a magnitude of target offset, and/or an orientation of the boom assembly 40 relative to the sprayer path 142 may be determined. With the boom offset, the target offset, and/or the orientation of the boom assembly 40 relative to the sprayer path 142, the computing system 202 may estimate a time at which a target 94 may be within an application region 88 of a nozzle 44*a*, 44*b*.

In various embodiments, the instructions 216 stored within the memory 212 of the computing system 202 may be executed by the processor 210 to implement a path analysis module 226. In general, the path analysis module 226 may be configured to process/analyze the sprayer path 142 to estimate or determine a boom offset of the boom assembly 40. Specifically, in several embodiments, the path analysis module 226 may be configured to execute one or more algorithms to determine a magnitude of boom offset, a magnitude of target offset, and/or an orientation of the boom assembly 40 relative to the sprayer path 142. For example, in some embodiments, the path analysis module 226 may data from the image analysis module in the form of a calculated offset based on a position of a reference object within successive image portions of the field 20. Additionally or alternatively, the path analysis module 226 may receive data from the steering system 82 indicative of a steering angle of the sprayer 10 relative to a reference location 106 of the sprayer 10. Based on the steering angle, the path analysis module 226 may determine a sprayer path 142. In turn, with a known sprayer path 142, the path analysis module 226 may utilize geometric equations, LUTs, and/or any other method to determine a boom offset of the boom assembly 40.

Referring still to FIG. 8, in some embodiments, the instructions 216 stored within the memory device 212 of the computing system 202 may also be executed by the processor 210 to implement a control module 228. In general, the control module 228 may be configured to electronically control the operation of one or more components of the agricultural sprayer 10. For instance, in several embodiments, the control module 228 may be configured to control the operation of each nozzle assembly 42a, 42b based on the determined boom offset, the orientation of the boom assembly 40 relative to the sprayer path 142, and/or a location of the target 94. For instance, based on the boom offset and the orientation of the boom assembly 40 relative to the sprayer path 142, the control module 228 may time an activation of a valve 46a, 46b to control the deposition of the agricultural product to selectively spray or treat the target 94 from a defined nozzle 44a, 44b. In some instances, by using the data provided by the imaging devices 90a, 90b associated with each nozzle 44a, 44b, a more accurate application of the agricultural product may be applied to various targets 94 within the field 20.

Further, as shown in FIG. 8, the computing system 202 may also include a transceiver 238 to allow for the computing system 202 to communicate with any of the various other system components described herein. For instance, one or more communicative links or interfaces (e.g., one or more data buses) may be provided between the transceiver 238 and the application system 204. In such instances, the images or other vision-based data captured by the imaging devices 90a, 90b may be transmitted from the imaging devices 90a, 90b to the computing system 202. In addition, the computing system 202 may provide instructions to activate/deactivate each valve 46a, 46b at various times to selectively spray or treat the target 94 based on a magnitude of boom offset, a magnitude of target offset, and/or an orientation of the boom assembly 40 relative to the sprayer path 142.

Similarly, one or more communicative links or interfaces may be provided between the transceiver 238 and the powertrain control system 22 that includes the power plant 24, the transmission system 26, and the brake system 28. Through the usage of any of these systems, the computing system 202 may collect data related to one or more sprayer conditions, such as speed variations that may cause the boom assembly 40 40 to move from its neutral position. In some instances, in addition to the computing system 202 determining a boom offset, the computing system 202 may also predict a future position of the boom assembly 40 based on data from the steering system 82 and the detected sprayer conditions. In turn, the computing system 202 may determine an upcoming activation time with the upcoming activation time defining a time in which a detected target 94 is to be positioned within an application region 88.

The power plant 24 is configured to vary the output of the engine to control the speed of the sprayer 10. For example, the power plant 24 may vary a throttle setting of the engine, a fuel/air mixture of the engine, a timing of the engine, and/or other suitable engine parameters to control engine output. In addition, the transmission system 26 may adjust gear selection within a transmission system 26 to control the speed of the sprayer 10. Furthermore, the brake system 28 may adjust braking force, thereby controlling the speed of the sprayer 10. While the illustrated powertrain control system 22 includes the power plant 24, the transmission system 26, and the brake system 28, it should be appreciated that alternative embodiments may include one or two of these systems, in any suitable combination. Further embodiments may include a powertrain control system 22 having other and/or additional systems to facilitate adjusting the speed of the sprayer 10.

Additionally or alternatively, one or more communicative links or interfaces (e.g., one or more data buses) may be provided between the transceiver 238 and the steering system 82 configured to control a direction of the sprayer 10 through manipulation of one or more wheels 14, 16 (FIG. 1) (or tracks). In some instances, the steering system 82 may be an electric power-assisted steering (EPAS) system that includes an electric steering motor 230 for turning the steered wheels 14, 16 to a steering angle based on a steering command generated by the computing system 202, whereby the steering angle may be sensed by a steering angle sensor 232 of the steering system 82 and provided to the computing system 202. The steering command may be provided for autonomously steering the sprayer 10 and may alternatively be provided manually via a rotational position (e.g., a steering wheel angle) of a steering device 234 (e.g., a steering wheel, a rotatable knob, and/or any other device). However, in some embodiments, the steering device 234 of the sprayer 10 may be mechanically coupled with the steered wheels 14, 16 of the sprayer 10, such that the steering device 234 moves in concert with steered wheels 14, 16 via an internal torque, thereby preventing manual intervention with the steering device 234 during autonomous steering of the sprayer 10. In such instances, the steering system 82 may include an input sensor 236 that senses torque (e.g., gripping and/or turning) on the steering device 234 that is not expected from autonomous control of the steering device 234 and therefore indicative of manual intervention by the driver. In some embodiments, external torque applied to the steering device 234 may serve as a signal to the computing system 202 that the driver has taken manual control and for the sprayer 10 to discontinue autonomous steering functionality.

Further, one or more communicative links or interfaces may be provided between the transceiver 238 and a user interface, such as a user interface 32 housed within the cab 30 of the sprayer 10 or at any other suitable location. The user interface 32 may be configured to provide feedback to the operator of the agricultural sprayer 10. Thus, the user interface 32 may include one or more feedback devices, such as display screens 32A, speakers, warning lights, and/or the like, which are configured to communicate such feedback. In addition, some embodiments of the user interface 32 may include one or more input devices 34 (FIG. 1), such as touchscreens, keypads, touchpads, knobs, buttons, sliders, switches, mice, microphones, and/or the like, which are configured to receive user inputs from the operator.

Still further, one or more communicative links or interfaces may be provided between the transceiver 238 and a remote electronic device 240. The one or more communicative links or interfaces may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 240 may also include a display for displaying information to a user. For instance, the electronic device 240 may display one or more user interfaces and may be capable of receiving remote user inputs. In addition, the electronic device 240 may provide feedback information, such as visual, audible, and tactile alerts, and/or allow the operator to alter or adjust one or more components of the sprayer 10 or the boom assembly 40 through the usage of the remote electronic device 240. It will be appreciated that the electronic device 240 may be any one of a variety of computing devices and may include a processor and memory. For example, the electronic device 240 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

In operation, the one or more imaging devices 90a, 90b may be positioned along the boom assembly 40 and may provide data related to imaged portions of an agricultural field 20 to the computing system 202. The one or more imaging devices 90a, 90b may provide vision-based data indicative of one or more objects that may be positioned below the boom assembly 40 as the sprayer 10 traverses the field 20. Based on the data captured by the one or more imaging devices 90a, 90b, the computing system 202 may be configured to identify a target 94 within the one or more objects.

In addition, the computing system 202 may identify one or more reference objects within the successive imaged portions from one of the one or more imaging devices 90a, 90b. Based on a positional change of each reference object within the imaged portions relative to a common origin and a defined time between the successive imaged portions, the computing system 202 may determine a speed of movement of the boom assembly 40 as the reference object may be generally stationary and/or a direction of movement of the boom assembly 40 as the reference object may be generally stationary.

Further, in various embodiments, the computing system 202, having a defined kinematic model of the sprayer 10, may determine a sprayer path 142, which may be defined as a path that the reference location 106 traverses as the sprayer 10 moves along the sprayer path 142. With a target defined, the computing system 202 may also determine a target offset between the target and the sprayer path 142. Further, the computing system 202 may determine a boom offset that defines a distance between the reference point 160 of the boom assembly 40 (e.g., a center axis of the boom assembly 40) and the sprayer path 142 (which may include a traversed path and a projected path). The computing system 202 may activate a nozzle assembly 42 positioned along the boom assembly 40 that defines an application region 88 positioned a lateral distance along the boom assembly 40 from the reference point 160 that is generally equal to the summation of the lateral distance between the target 94 and the sprayer path 142 and the boom offset. Accordingly, the computing system 202 may alter which nozzle assembly 42 is activated based on lateral deviations caused when the sprayer 10 traverses a non-linear path.

It will be appreciated that, although the various control functions and/or actions will generally be described herein as being executed by the computing system 202, one or more of such control functions/actions (or portions thereof) may be executed by a separate computing system 202 or may be distributed across two or more computing systems (including, for example, the computing system 202 and a separate computing system). For instance, in some embodiments, the computing system 202 may be configured to acquire data from the imaging devices 90a, 90b for subsequent processing and/or analysis by a separate computing system (e.g., a computing system associated with a remote server). In other embodiments, the computing system 202 may be configured to execute the image analysis module 224 to determine and/or monitor one or more objects and/or field conditions within the field 20, while a separate computing system (e.g., a sprayer computing system associated with the agricultural sprayer 10) may be configured to execute the control module 228 to control the operation of the agricultural sprayer 10 based on data and/or instructions transmitted from the computing system 202 that are associated with the monitored objects and/or field conditions.

Figure 9:
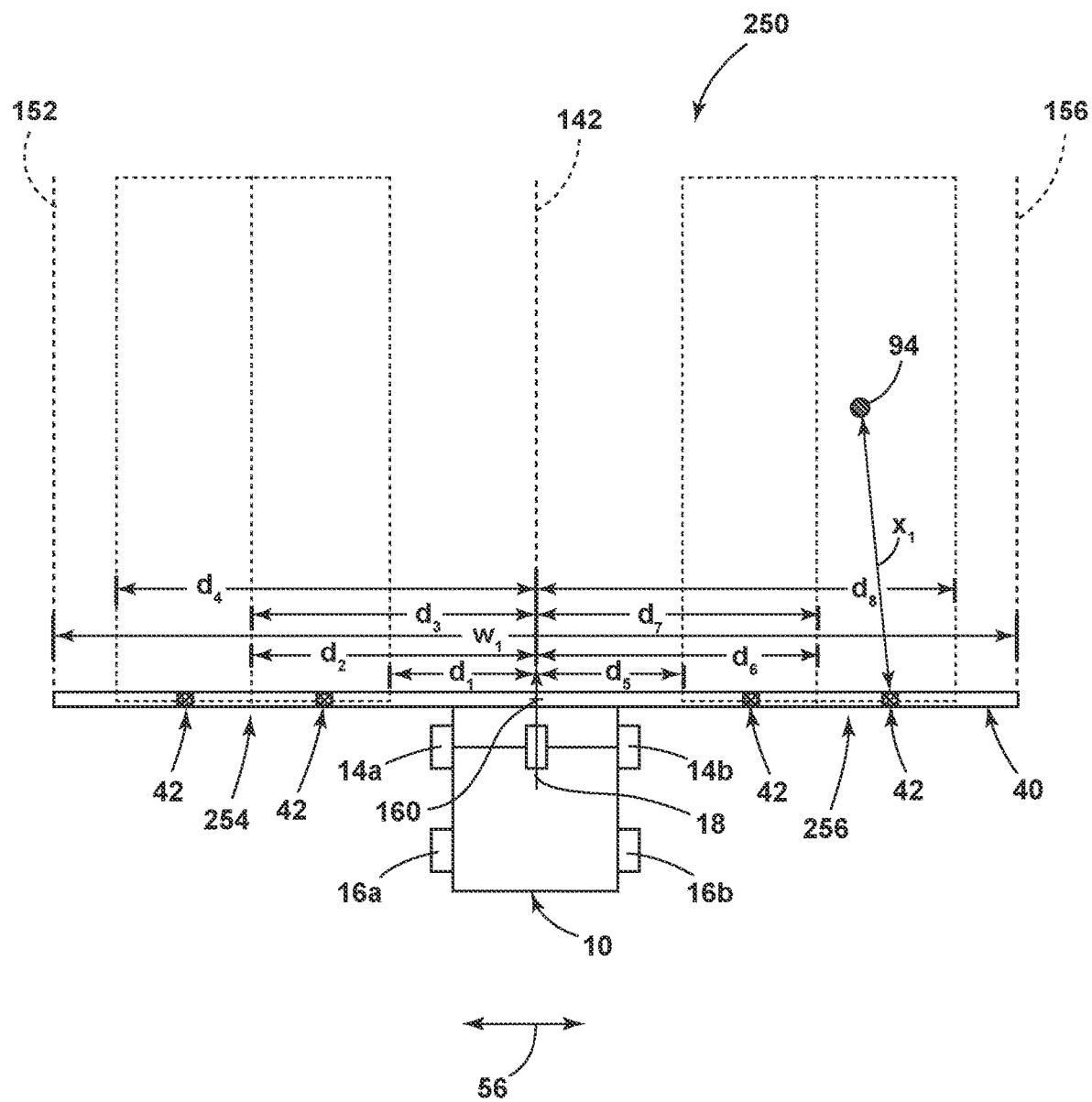
FIG. 9 is a simplified schematic representation of a sprayer having a boom assembly traveling a generally linear path and a target positioned a first distance from the boom assembly in accordance with aspects of the present subject matter.
Figure 10:
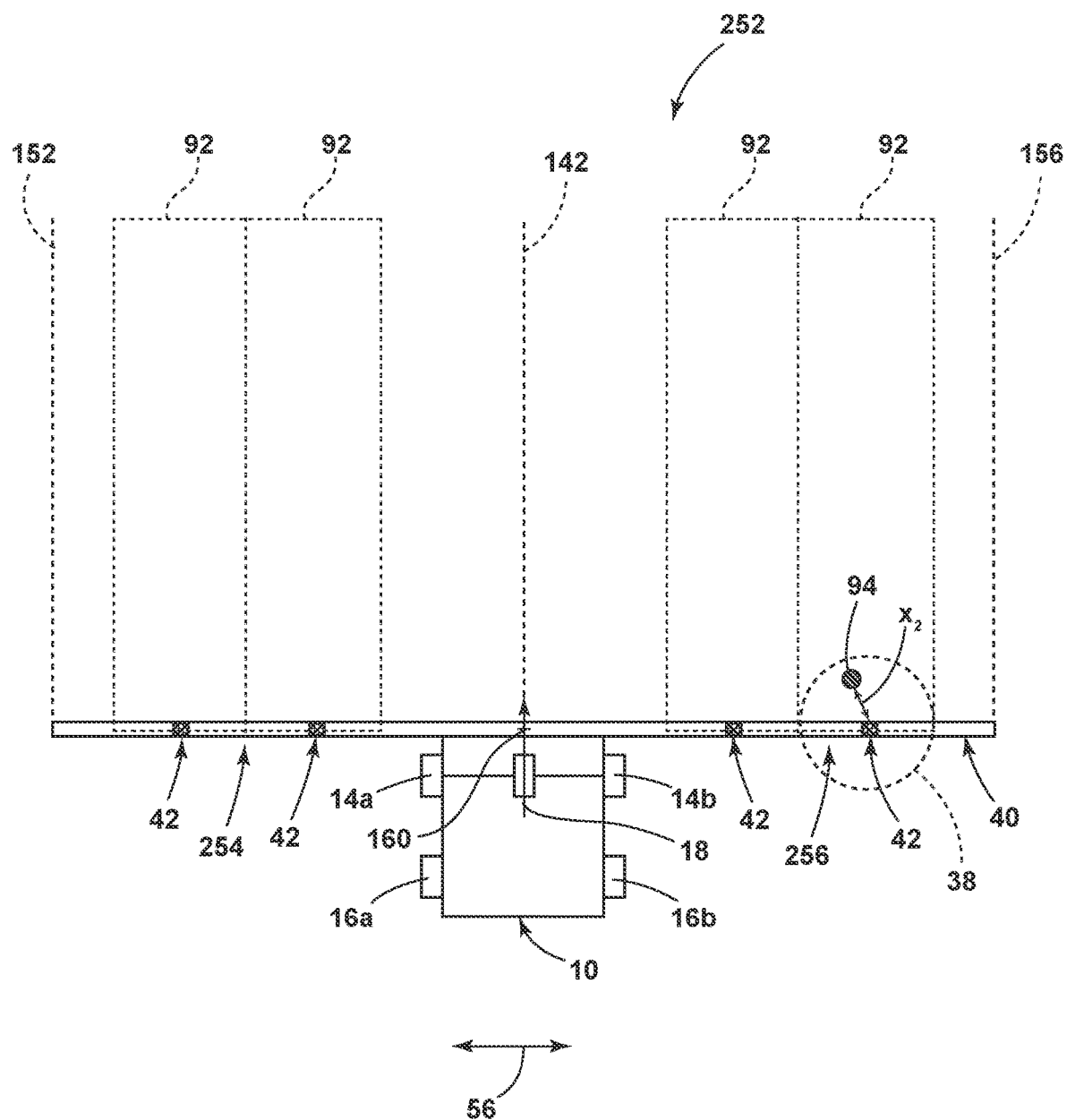
FIG. 10 is a simplified schematic representation of a sprayer having a boom assembly traversing a generally linear path and a target positioned a second distance from the boom assembly in accordance with aspects of the present subject matter.

Referring now to FIGS. 9 and 10, schematic views of nozzle assemblies 42 positioned along a boom arm 50 are illustrated in accordance with various aspects of the present disclosure. Specifically, FIGS. 9 and 10 illustrate an embodiment of a spray application of the system 200 with the sprayer 10 having a direction of movement 18 that is generally linear.

With further reference to FIGS. 9 and 10, in several embodiments, each imaging device 90 may provide the computing system 202 with data indicative of a first imaged portion 250 (FIG. 9) of the field 20 and a second imaged portion 252 (FIG. 10) of the field 20. As illustrated in FIG. 6, a target 94 is identified as a location that is to have an agricultural product applied thereto. However, the target 94 is positioned an initial distance $X_1$ that is external of an application region 88 of the nozzle assembly 42. As illustrated in FIG. 7, as the sprayer 10 travels along the direction of forward travel 18, the computing system 202 may receive data from the imaging devices 90 and utilize geometric equations, LUTs, and/or any other method to determine that the target 94 is a distance $X_2$ from the nozzle assembly 42 that is within the application region 88 of the nozzle assembly 42. In such instances, the computing system 202 may activate the valve 46 of the nozzle assembly 42 to apply the agricultural product to the target 94.

Still referring to FIGS. 9 and 10, when the sprayer 10 traverses a generally linear path, the boom assembly 40 may define an unfolded width $w_1$. The unfolded width may include right and left portions 254, 256 that are of a generally equal width from a reference point 160, which may be aligned with a center point of the boom assembly 40.

In the illustrated examples of FIGS. 9 and 10, an inner nozzle assembly 42 of the left portion 254 of the boom assembly 40 may have an application region 88 that extends from a first distance $d_1$ from the reference point 160 to a second distance $d_2$ from the reference point 160 in a lateral direction 56. An outer nozzle assembly 42 of the left portion 254 of the boom assembly 40 may have an application region 88 that extends from a third distance $d_3$ from the reference point 160 to a fourth distance $d_a$ from the reference point 160. In some examples, the second and third distances $d_2$, $d_3$ may be generally equal such that the inner and outer nozzle assemblies 42 cover a continuous length. Additionally or alternatively, the third distance $d_3$ may be less than the second distance $d_2$ such that there is an amount of overlap between the application region 88 of the inner nozzle assembly 42 and the outer nozzle assembly 42 or the third distance $d_3$ may be greater than the second distance such that there is a gap between the application region 88 of the inner nozzle assembly 42 and the outer nozzle assembly 42.

Likewise, an inner nozzle assembly 42 of the right portion 256 of the boom assembly 40 may have an application region 88 that extends from a fifth distance $d_5$ from the reference point 160 to a sixth distance $d_6$ from the reference point 160 in a lateral direction 56. An outer nozzle assembly 42 of the right portion 256 of the boom assembly 40 may have an application region 88 that extends from a seventh distance $d_7$ from the reference point 160 to an eighth distance $d_8$ from the reference point 160. In some examples, the sixth and seventh distances $d_6$, $d_7$ may be generally equal such that the inner and outer nozzle assemblies 42 cover a continuous length. Additionally or alternatively, the seventh distance $d_7$ may be less than the sixth distance $d_6$ such that there is an amount of overlap between the application region 88 of the inner nozzle assembly 42 and the outer nozzle assembly 42 or the seventh distance $d_7$ may be greater than the sixth distance $d_6$ such that there is a gap between the application region 88 of the inner nozzle assembly 42 and the outer nozzle assembly 42.

It will be appreciated that the boom assembly 40 is illustrated having inner and outer nozzle assemblies 42 on both the left portion 254 and the right portion 256 for illustrative purposes. It will be appreciated that the boom assembly 40 may include any number of nozzle assemblies 42 having any orientation without departing from the scope of the teachings provided herein.

As the sprayer 10 traverses a generally linear path, a target 94 may be identified. Based on a lateral distance from the reference point 160 to the target 94, the computer system may determine which nozzle assembly 42 to activate, which is the outer nozzle assembly 42 of the right portion 256 in the example illustrated in FIGS. 9 and 10. When the sprayer 10 traverses a generally linear path, the reference point 160 of the boom assembly 40 and the reference location 106 of the sprayer 10 may traverse a generally common path (i.e., the sprayer path 142).

Figure 11:
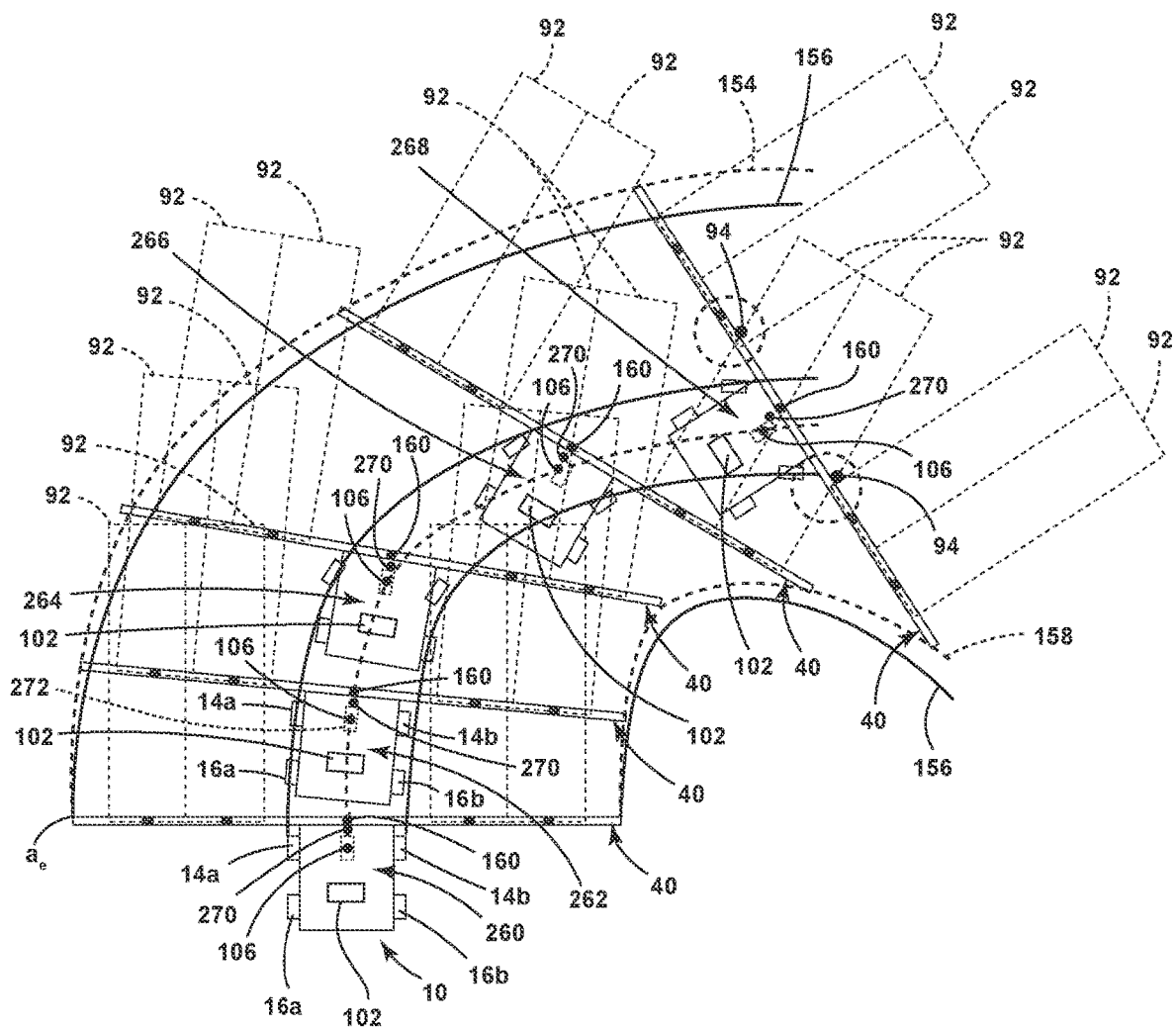
FIG. 11 is a simplified schematic representation of a sprayer having a boom assembly traversing a right turn in accordance with aspects of the present subject matter.
Figure 12:
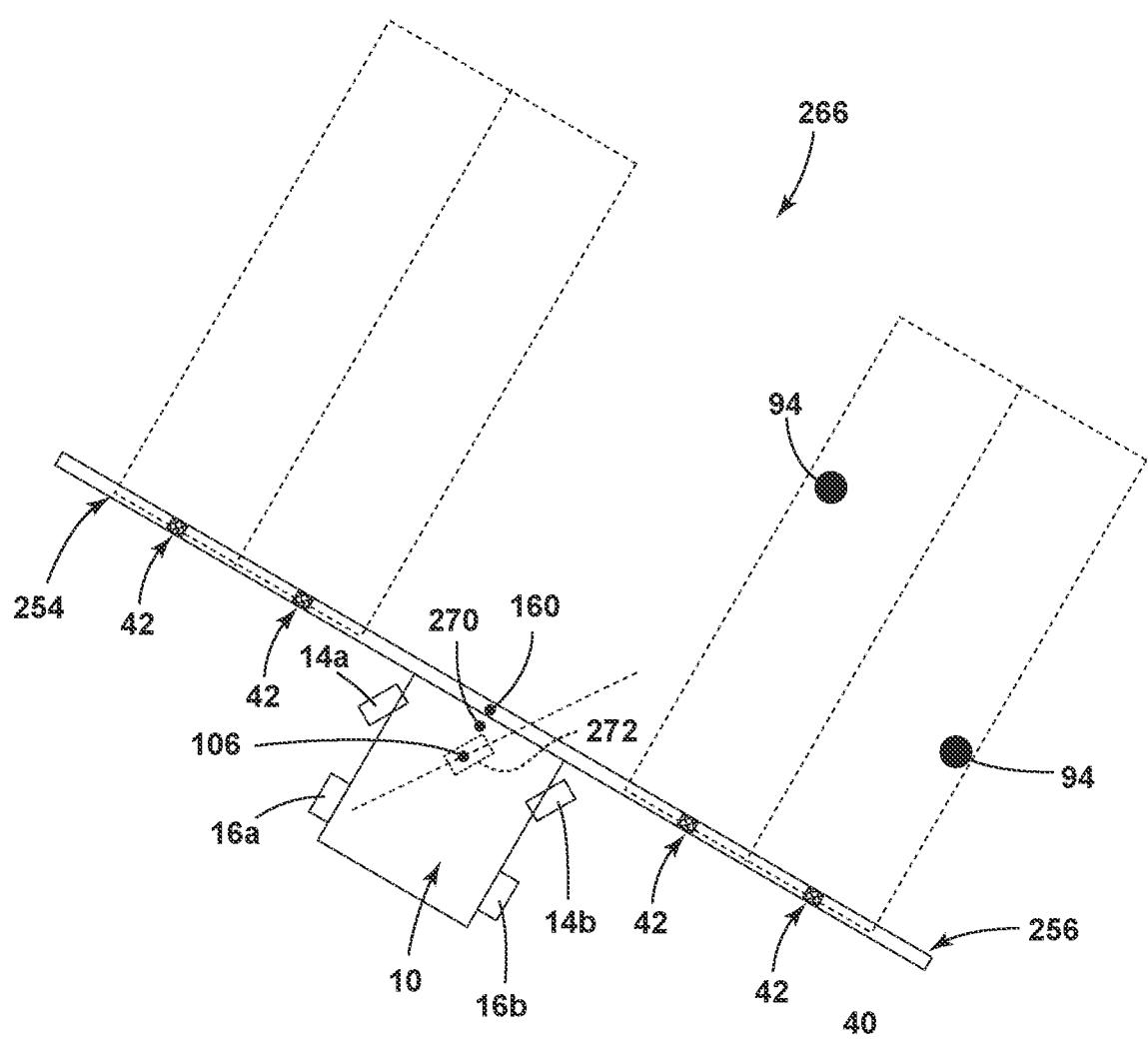
FIG. 12 is an enhanced view on one snapshot of traversal of the turn by the sprayer of FIG. 11 in accordance with aspects of the present subject matter.
Figure 13:
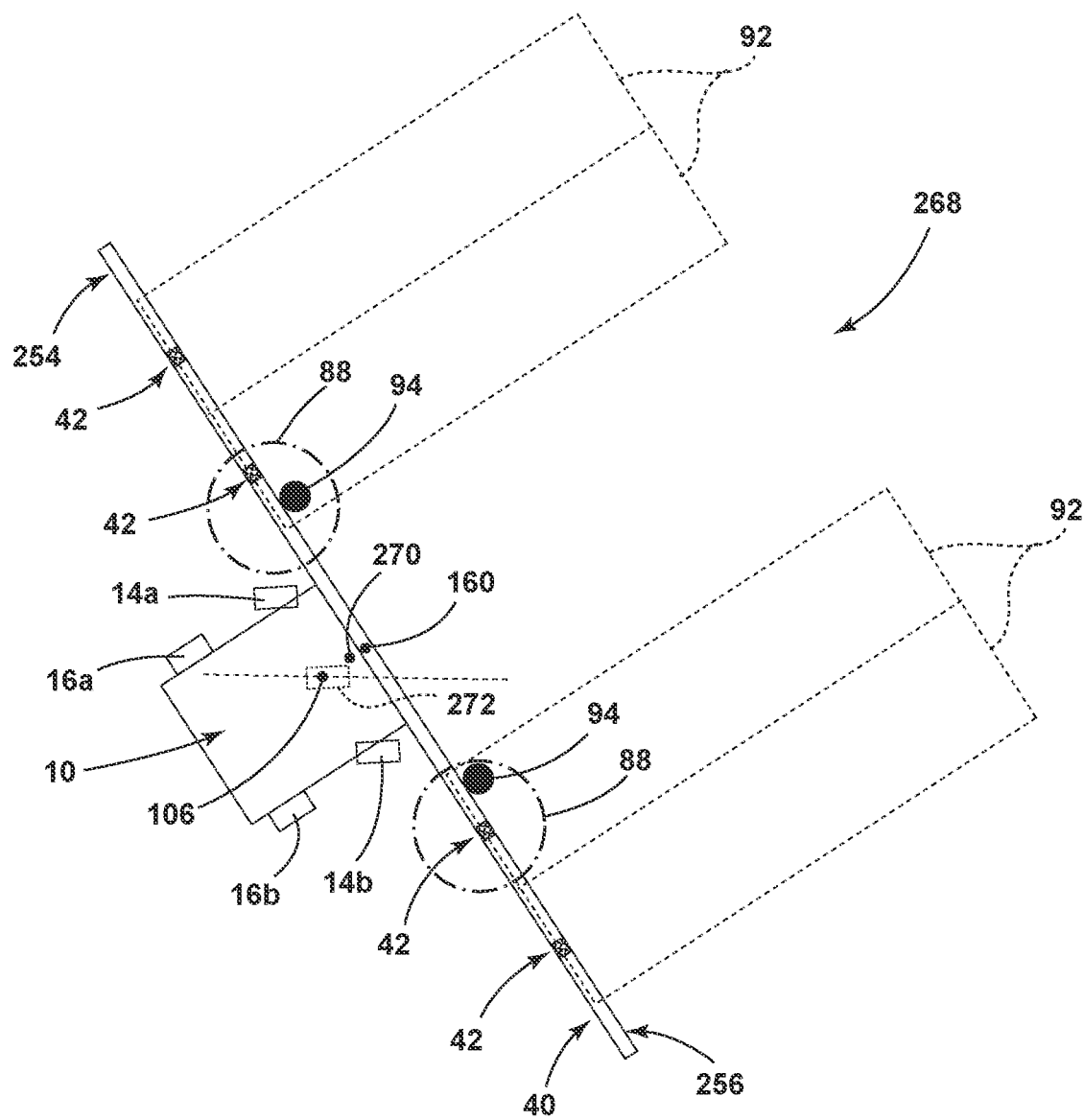
FIG. 13 is an enhanced view on one snapshot of traversal of the turn by the sprayer of FIG. 11 in accordance with aspects of the present subject matter.

Referring now to FIGS. 11-13, a trajectory of a sprayer 10 is illustrated at various sequential snapshots during a turn operation in accordance with various aspects of the present disclosure. Specifically, FIG. 11 illustrates the sprayer 10 traversing a right turn, FIG. 12 illustrates the sprayer 10 at one snapshot during the traversal of the turn, and FIG. 13 illustrates the sprayer 10 at an additional snapshot after the snapshot of FIG. 12 during the traversal of the turn.

As illustrated, the sprayer 10 is moving straight ahead in 260. At 262, the steering system 82 receives a steering command, which may be human or computer-generated. In response to the steering command, the computing system 202 determines a virtual steering angle for a virtual wheel 272 (shown as a dotted wheel in each of snapshots 260, 262, 264, 266, 268) located at the reference location 106 between the two front wheels 14a, 14b. The actual steering angles for the two steered wheels 14a, 14b are computed based on their distance away from the virtual wheel 272. As provided herein, the Ackerman steering equation (or any other method) may be used to determine the steering angle of each wheel 14a, 14b. In instances in which the Ackerman steering equation is utilized, the steering angle of each steered wheel 14a, 14b may be calculated by the following equation:

$$\cot a_o - \cot a_i = \frac{t}{l}, \qquad (1)$$

where $\alpha_i$ is the steering angle of the inner wheel (i.e., the wheel nearer the turning radius), $\alpha_o$ is the steering angle of the outer wheel, t is track width, i.e., the distance between the outer and inner wheels or lateral wheel separation, and l is the wheelbase, i.e., the distance between the front wheels and the rear wheels or longitudinal wheel separation.

The equation above is provided in terms of actual wheels, inner and outer. The equation can be recast for a virtual wheel 272:

$$\cot a_o - \cot a_v = \frac{t_{vo}}{l_{vo}}, \qquad (2)$$

when the virtual wheel 272 is inside with respect to the actual wheel, or $$\cot a_v - \cot a_i = \frac{t_{vi}}{l_{vi}}, \qquad (3)$$

when the virtual wheel 272 is outside with respect to the actual wheel, where $t_{vo}$ and $t_{vi}$ are the lateral wheel separations between the virtual wheel 272 and the outer and inner wheels, respectively, and $l_{vo}$ and $l_{vi}$ are the longitudinal distances between the virtual wheel 272 and the respective outer and inner rear wheels or longitudinal wheel separation.

The Ackerman angles for a four-wheel steering situation can be determined by the following equation:

$$\cot a_v - \cot a_i = \frac{2t}{l} \qquad (4)$$

for wheels proximate to the aft portion of the sprayer 10 in the direction of forward travel 18 (front wheels for this Ackerman discussion).

In the illustrated example, the right front wheel 14b has a greater steering angle than the left front wheel 14a because of the smaller diameter circle it travels in a right turn as shown in snapshot 262.

With reference to the example shown in FIG. 11, the steering system 82 may receive an input to turn further to the right. In response, the front steered wheels 14a, 14b are turned even further to the right in snapshot 264. As with snapshot 262, the computing system 202 computes a virtual steering angle for the virtual wheel 272 located between the steered wheels 14a, 14b based on the positions of the steered wheels 14a, 14b. At 266 and 268, the steering angles of the front steered wheels 14a, 14b may be generally constant to continue turning the sprayer 10.

As the sprayer 10 moves along the snapshots 260, 262, 264, 266, and 268, the virtual wheel 272 may rotate relative to the reference location 106 on the sprayer 10, which in the illustrated example is a location disposed midway between the pair of steerable wheels 14a, 14b of the sprayer 10. As provided herein, as the sprayer 10 moves along the sprayer path 142, each of the wheels 14a, 14b, 16a, 16b may traverse a unique path. In the example illustrated in FIG. 11, the path of travel 144, 146 of the front left wheel 14a and front right wheel 14b is illustrated.

As illustrated, due to the sprayer 10 traversing a non-linear path at 262, 264, 266, and 268, a front central point 270 of the sprayer 10 may be offset from the sprayer path 142, which may be caused by the reference location 106 of the sprayer 10 is positioned aft of the front central point of the sprayer 10. Further, as the boom assembly 40 in the illustrated example is fore of a front portion 150 of the sprayer 10, the reference point 160 of the boom assembly 40 is also offset of the sprayer path 142. As such, the actual path of the boom assembly 40, which is illustrated by lines 154 and 158 may have an off-tracking width that may be generally equal to the offset of the reference point 160 of the boom from the sprayer path 142.

In addition, as generally illustrated in snapshot 260, when the sprayer 10 traverses a generally linear path, an extension axis $\alpha_c$ of the boom may be generally perpendicular to the sprayer path 142. Conversely, the extension axis may be non-perpendicular to the sprayer path 142 when the sprayer 10 traverses a non-linear path. Accordingly, to improve the accuracy of the sprayer system 200, the computing system 202 may receive data related to a first imaged portion 250 of an agricultural field 20 from the one or more imaging devices 90 and identify a target 94 within the first imaged portion 250 of the agricultural field 20. Once the target 94 has been identified, which in the illustrated embodiment, may occur at snapshot 266, the computing system 202 may receive data related to an inputted steering command from the steering system 82 and/or data from successive images of the target 94 from one or more imaging devices 90.

The computing system 202 may utilize geometric equations, LUTs, and/or any other method to determine an upcoming activation time in which the target 94 encroaches into an application region 88 of one of the nozzle assemblies 42, the computing system 202 may also determine a target offset of the target 94 relative to the sprayer path 142 and a boom offset of the assembly relative to the sprayer path 142, both of which may be based the inputted steering command from the steering system 82 and/or successive images received from the one or more imaging devices 90.

As such, in the illustrated embodiment, at snapshot 266, an imaging device 90 associated with the inner nozzle assembly 42 of the right portion 256 of the boom assembly 40 may detect a first upcoming target 94. Likewise, the outer nozzle assembly 42 of the right portion 256 of the boom assembly 40 may detect an upcoming second target 94. In response to identifying one or more targets 94, the computing system 202 may determine an activation time in which the first and second targets 94 will encroach into an application region 88 of the boom assembly 40.

In some instances, to determine an appropriate activation time, the computing system 202 may determine an offset angle between the boom assembly 40 and the sprayer path 142 for each portion 254, 256 of the boom assembly 40. In instances in which the boom assembly 40 is non-perpendicular to the sprayer path 142 and the outside portion of the boom assembly 40 may be activated at a later time based on the outer portion extending aft of the perpendicular extension direction. Conversely, the inside portion of the boom assembly 40 may be fore of the perpendicular extension direction, and thus, may be activated at an earlier time compared to an instance in which the boom assembly 40 is perpendicular to the sprayer path 142 based on the inside portion extending fore of the perpendicular extension direction $\alpha_e$.

Once an activation time is determined, the computing system 202 may determine a nozzle assembly 42 to activate based on the position of the first target 94 and/or second target 94 relative to the boom assembly 40. For illustrative purposes, a path 154, 158 of each end portion of the boom assembly 40 is also illustrated. In addition, a reference line illustrating a lateral distance $l_d$ equal to the length of the left and right portions 254, 256 of the boom assembly 40 from the reference position is also illustrated. As shown, the path 154, 158 of the end portions of the boom assembly 40 may be positioned further from the turning center 104 than the reference lines 152, 156 defining an offtrack width $LO_3$, $LO_4$ therebetween. Due to the boom movement path, as generally illustrated by lines 154, 158, being offset from the reference lines 152, 156, the computing system 202 may select a nozzle assembly 42 to activate that may accurately apply the agricultural product to the target 94.

For example, in some embodiments, the computing system 202 may determine a target offset relative to the sprayer path 142. The computing system 202 may also determine a boom offset of the reference point 160 of the boom assembly 40 relative to the sprayer path 142. In turn, the computing system 202 may determine a position of the target 94 relative to the boom based on the following equation when the target 94 is positioned outside of the sprayer path 142, and the reference point 160 of the boom assembly 40 is offset from the sprayer path 142:

$$t_o - b_o = D_{na} \tag{5}$$

Conversely, the computing system 202 may determine a position of the target 94 relative to the boom based on the following equation when the target 94 is positioned inside of the sprayer path 142 and the reference point 160 of the boom assembly 40 is offset from the sprayer path 142:

$$t_o + b_o = D_{na} \tag{6}$$

where $t_o$ is the target offset distance between the target 94 and the sprayer path 142, $b_o$ is the boom offset distance between the reference point 160 of the boom assembly 40 and the sprayer path 142, and $D_{na}$ is the lateral distance along the boom assembly 40 from the reference point 160 to a position of the target 94 along the boom assembly 40. In turn, the computing system 202 may activate a nozzle assembly 42 that has an application region 88 that aligns with the defined distance along the boom assembly 40 such that the target 94 has the agricultural product applied thereto. In the illustrated example of FIGS. 11-13, based on the sprayer 10 traversing a non-linear path, at snapshot 268, the first target 94, at the activation time, may be within an application region 88 of the inner nozzle assembly 42 of the left portion 254 of the boom assembly 40. The second target 94, at the activation time, may be within an application region 88 of the inner nozzle assembly 42 of the right portion 256 of the boom assembly 40.

Figure 14:
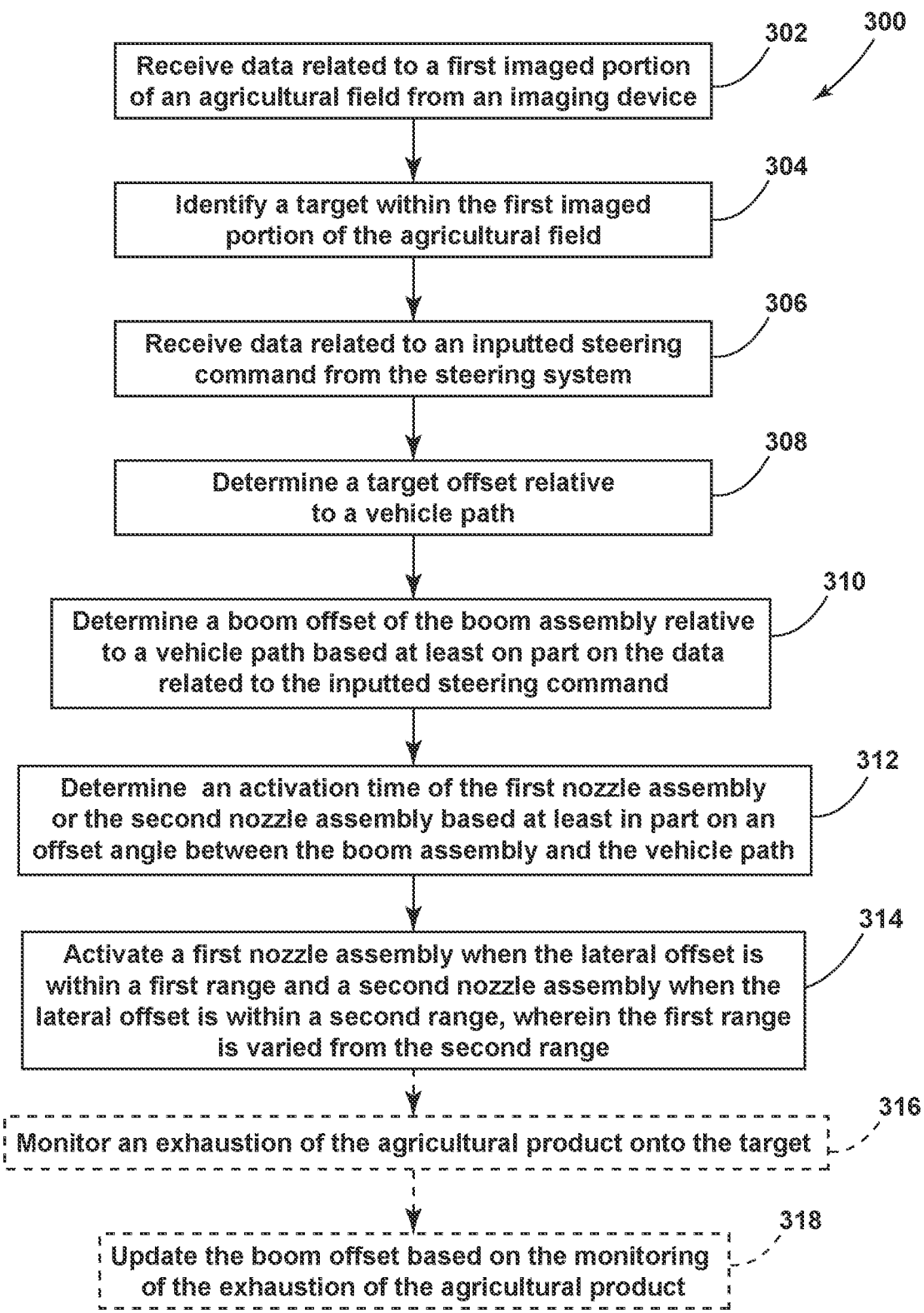
FIG. 14 illustrates a flow diagram of a method of selectively applying an agricultural product in accordance with aspects of the present subject matter.

Referring now to FIG. 14, a flow diagram of some embodiments of a method 300 for selectively applying an agricultural product is illustrated in accordance with aspects of the present subject matter. In general, the method 300 will be described herein with reference to the sprayer 10 and the system 200 described above with reference to FIGS. 1-13. However, it will be appreciated by those of ordinary skill in the art that the disclosed method 300 may generally be utilized with any suitable agricultural sprayer 10 and/or may be utilized in connection with a system having any other suitable system configuration. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 14, at (302), the method 300 can include receiving data related to a first imaged portion of an agricultural field from an imaging device. At (304), the method 300 can include identifying a target within the first imaged portion of the agricultural field.

At (306), the method 300 can include receiving data related to an inputted steering command from the steering system. As provided herein, the steering command may be human or computer-generated and can relate to a change in the steering angle of the steered wheels of the sprayer.

At (308), the method can include determining a target offset relative to a sprayer path. The target offset may be a distance from the target to the sprayer path in a lateral direction when the target would be within an application region of a nozzle assembly of the sprayer.

At (310), the method 300 can include determining a boom offset of the boom assembly relative to a sprayer path, which may be based at least on part on the data related to the inputted steering command. As provided herein, when the sprayer traverses a generally linear path, the boom offset may be equal to zero. However, when the sprayer traverses a generally non-linear path, the boom offset may be non-zero, which may be due to the boom assembly being fore or aft of the steered wheels of the sprayer.

At (312), the method 300 can include determining an activation time of a first nozzle assembly or a second nozzle assembly based at least in part on an offset angle between the boom assembly and the sprayer path. Once the activation time is determining, at (314), the method 300 can include activating a first nozzle assembly when the lateral offset is within a first range and a second nozzle assembly when the lateral offset is within a second range, wherein the first range is varied from the second range. As provided herein, the first nozzle assembly may have a first application region that is defined between a first distance from the boom assembly reference point (e.g., center point) and a second distance from the boom assembly reference point. Likewise, the second nozzle assembly may have a second application region that is defined between a third distance from the boom assembly reference point and a fourth distance from the boom assembly reference point. As such, when the target is within the first application region, the first nozzle assembly is activated and when the target is within the second application region, the second nozzle assembly is activated.

In some instances, at (316), the method 300 can include monitoring a deposition of the agricultural product onto the target. At (318), the method 300 can include updating the boom offset based on the monitoring of the deposition of the agricultural product. In various examples, the method may implement machine learning methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the calculated offsets. In some instances, the machine learning engine may allow for changes to the calculated offsets to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for an agricultural sprayer, the system comprising:
    a boom assembly operably coupled with a chassis;
    a steering system operably coupled with the chassis; and
    a computing system operably coupled with the steering system, the computing system configured to:
        receive data related to an inputted steering command from the steering system;

determine a sprayer path based at least in part on the data related to the inputted steering command;
determine an offtrack width of the boom assembly relative to a sprayer path;
determine a boom offset of the assembly relative to the sprayer path based at least in part on the data related to the inputted steering command; and
determine an activation time of a nozzle assembly based at least in part on a boom orientation relative to a sprayer path.

2. The system of claim 1, further comprising:
one or more imaging devices; and
a nozzle assembly, wherein the computing system is operably coupled with the one or more imaging devices and the nozzle assembly, and wherein the computing system is further configured to:
receive data related to a first imaged portion of an agricultural field from the one or more imaging devices;
identify a target within the first imaged portion of the agricultural field; and
determine a target offset of the target relative to the sprayer path.

3. The system of claim 2, wherein the computing system is further configured to:
determine a boom offset of the boom assembly relative to the sprayer path.

4. The system of claim 2, wherein the one or more imaging devices is positioned on an inside side of a boom assembly reference point and the nozzle assembly is positioned on an outside side of the boom assembly reference point.

5. A system for an agricultural sprayer, the system comprising:
a boom assembly operably coupled with a chassis;
a steering system operably coupled with the chassis and including a steering sensor;
one or more imaging devices;
one or more nozzle assemblies, wherein the one or more nozzle assemblies each includes a valve operably coupled with a nozzle and configured to control a flow of agricultural product through the nozzle; and
a computing system operably coupled with the one or more imaging devices and the one or more nozzle assemblies, the computing system configured to:
receive data related to a first imaged portion of an agricultural field from the one or more imaging devices;
identify a target within the first imaged portion of the agricultural field;
receive data related to an inputted steering command from the steering system;
determine a sprayer path based at least in part on the data related to the inputted steering command;
determine a target offset of the target relative to the sprayer path and a boom offset of the assembly relative to the sprayer path based at least in part on the data related to the inputted steering command; and
determine an activation time of the valve of at least one of the one or more nozzle assemblies based at least in part on a boom offset angle relative to the sprayer path.

6. The system of claim 5, wherein the computing system is further configured to:
determine a lateral distance along the boom assembly from a reference point to a lateral position of the target at the activation time.

7. The system of claim 6, wherein the lateral distance is less than the target offset when the sprayer is traveling along a non-linear path and the target is positioned outside of the sprayer path relative to a turning center.

8. The system of claim 6, wherein the lateral distance is greater than the target offset when the sprayer is traveling along a non-linear path and the target is positioned inside of the sprayer path relative to a turning center.

9. The system of claim 5, wherein the activation time is based at least in part on data received from the steering system.

10. The system of claim 5, wherein the activation time is based at least in part on data received from the one or more imaging devices.

11. The system of claim 5, wherein the boom offset defines an offset between a reference point of the boom assembly and the sprayer path.

12. The system of claim 5, wherein the one or more nozzle assemblies includes a first nozzle assembly and a second nozzle assembly, and wherein the one or more imaging devices includes a first imaging device associated with a first nozzle assembly and a second imaging device associated with a first nozzle assembly, and wherein the first imaging device provides the first imaged portion to the computing system and the second nozzle assembly deposits an agricultural product onto the target.

13. The system of claim 12, wherein the second nozzle assembly is outside of the first nozzle assembly relative to a turning center.

14. A method for selectively applying an agricultural product, the method comprising:
receiving, with a computing system, data related to a first imaged portion of an agricultural field from an imaging device;
identifying, with the computing system, a target within the first imaged portion of the agricultural field;
receiving, with the computing system, data related to an inputted steering command from the steering system;
determining, with the computing system, a target offset relative to a sprayer path based at least in part on the data related to the inputted steering command;
determining, with the computing system, a boom offset of a boom assembly relative to a sprayer path based at least on part on the data related to the inputted steering command; and
activating, with the computing system, a first nozzle assembly when a lateral offset is within a first range and a second nozzle assembly when the lateral offset is within a second range, wherein the first range is varied from the second range.

15. The method of claim 14, further comprising:
monitoring, with the computing system, a deposition of the agricultural product onto the target; and
updating, with the computing system, the boom offset based on the monitoring of the deposition of the agricultural product.

16. The method of claim 15, wherein a machine learning engine updates the boom offset.

17. The method of claim 14, further comprising:
determining, with the computing system, an activation time of the first nozzle assembly or the second nozzle assembly based at least in part on an offset angle between the boom assembly and the sprayer path.

* * * * *